US010242082B2

(12) United States Patent
Hardin

(10) Patent No.: US 10,242,082 B2
(45) Date of Patent: Mar. 26, 2019

(54) CONTEXT-DRIVEN MULTI-USER COMMUNICATION

(71) Applicant: Microsoft Technology Licensing, LLC, Redmond, WA (US)

(72) Inventor: David Alan Hardin, Tukwila, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 408 days.

(21) Appl. No.: 14/569,575

(22) Filed: Dec. 12, 2014

(65) Prior Publication Data

US 2016/0171068 A1 Jun. 16, 2016

(51) Int. Cl.
*G06F 17/30* (2006.01)
*G06F 11/14* (2006.01)
*G06N 99/00* (2019.01)

(52) U.S. Cl.
CPC .... *G06F 17/30575* (2013.01); *G06F 11/1415* (2013.01); *G06F 17/3051* (2013.01); *G06F 17/30424* (2013.01); *G06F 17/30581* (2013.01); *G06N 99/005* (2013.01)

(58) Field of Classification Search
CPC ........... G06F 17/30575; G06F 11/1415; G06F 17/30424; G06F 17/3051; G06F 17/30581; H04L 67/1095; G06N 99/005
USPC .................................................. 707/609–639
See application file for complete search history.

(56) References Cited

U.S. PATENT DOCUMENTS

| | | | |
|---|---|---|---|
| 5,758,355 A * | 5/1998 | Buchanan | G06F 17/30575 |
| 8,185,501 B1 | 5/2012 | Cherukumudi et al. | |
| 2003/0120957 A1 * | 6/2003 | Pathiyal | G06F 21/6218 726/28 |
| 2006/0046742 A1 * | 3/2006 | Zhang | H04L 63/105 455/456.2 |
| 2006/0224597 A1 * | 10/2006 | Fitzpatrick | G06F 17/30575 |
| 2008/0082652 A1 | 4/2008 | Gates et al. | |

(Continued)

OTHER PUBLICATIONS

AppBoxr, retrieved on Oct. 10, 2014 at <<http://appboxr.com/>> 8 pages.

(Continued)

*Primary Examiner* — Hares Jami
(74) *Attorney, Agent, or Firm* — Arent Fox LLP

(57) ABSTRACT

A context-driven multi-user system may include distributed computing resource(s) that replicate proper subset(s) of user-relevant context data to computing device(s). A replication server may receive an update record corresponding to stored context data and determine propagation records based at least in part thereon. Each propagation record may correspond to a respective, different proper subset of the context data. The replication server may transmit the propagation records to respective replication clients. A replication client may receive a propagation record and modify local context data in response. The replication client may receive a data record and determine an update record in response and using the local context data. The computing device may transmit the determined update record. A server may receive a query specification referencing a data source and transmit the query specification to a replication client of the multi-user system, the client corresponding to the data source.

20 Claims, 11 Drawing Sheets

(56) References Cited

U.S. PATENT DOCUMENTS

| | | | |
|---|---|---|---|
| 2011/0039522 A1* | 2/2011 | Partridge | G01S 19/45 455/414.1 |
| 2011/0145926 A1* | 6/2011 | Dalcher | G06F 11/3466 726/26 |
| 2012/0030160 A1 | 2/2012 | Ratnam et al. | |
| 2012/0095973 A1* | 4/2012 | Kehoe | G06F 8/70 707/694 |
| 2012/0323853 A1* | 12/2012 | Fries | G06F 11/301 707/649 |
| 2013/0046725 A1 | 2/2013 | Cammert et al. | |
| 2013/0083919 A1* | 4/2013 | Sobue | G06F 21/62 380/28 |
| 2013/0117353 A1* | 5/2013 | Wong | G06F 17/30867 709/203 |
| 2013/0191185 A1 | 7/2013 | Galvin | |
| 2013/0332240 A1 | 12/2013 | Patri et al. | |
| 2014/0108318 A1 | 4/2014 | Herzig et al. | |
| 2014/0366157 A1* | 12/2014 | Yancey | G06F 21/62 726/28 |
| 2015/0106403 A1* | 4/2015 | Haverinen | G06F 17/30604 707/792 |

OTHER PUBLICATIONS

Big Data Techniques, published Dec. 29, 2013, retrieved at <<https://bigneedleinhaystack.wordpress.com/tag/ab-testing/>> 4 pages.

Fulop et al., "Predictive Complex Event Processing: A Conceptual Framework for Combining Complex Event Processing and Predictive Analytics," In Proceedings of the Fifth Balkan Conference in Informatics, published Sep. 16, 2012, retreived at <<http://dl.acm.org/citation.cfm?id=2371323>> 6 pages.

Fulop et al., Survey on Complex Event Processing and Predictive Analytics, In Technical Report, published Jul. 30, 2010, retrieved at <<http://www.inf.u-szeged.hu/~beszedes/research/cep_pa_tech2010.pdf>> 59 pages.

Hammond et al., "The Future of Mobile Application Development," In Proceedings of Forrester Research, published on Jan. 17, 2013, retrieved at <<https://www.forrester.com/The+Future+of+Mobile+Application+Development/fulltext/-/E-RES89181>> 2 pages.

Hanson, "Event-driven services in SOA," published Jan. 31, 2005, retrieved at <<http://www.javaworld.com/article/2072262/soa/event-driven-services-in-soa.html>> 8 pages.

Heinze et al., "Elastic Complex Event Processing under Varying Query Load," In Proceedings of the First International Workshop on Big Dynamic Distributed Data, published Aug. 30, 2013, retrieved at <<http://ceur-ws.org/Vol-1018/paper1.pdf>> 6 pages.

Hermosillo, "Towards Creating Context-Aware Dynamically-Adaptable Business Processes Using Complex Event Processing," published Jun. 2012, In PhD Thesis, retrieved at <<http://tel.archives-ouvertes.fr/docs/00/70/93/03/PDF/hermosillo-thesis.pdf>> 175 pages.

Hermosillo et al., "Using Complex Event Processing for Dynamic Business Process Adaptation," In Proceedings IEEE International Conference on Services Computing, published Jul. 5, 2010, retrieved at <<http://hal.univ-lille3.fr/docs/00/48/25/78/PDF/scc-2650-CR.pdf>> 8 pages.

Oded, "Complex Event Processing (CEP): A key for real-time, context aware, analytics," published Jul. 22, 2014, retrieved at <<http://h30507.www3.hp.com/t5/Telecom-IQ/Complex-Event-Processing-CEP-A-key-for-real-time-context-aware/ba-p/166926#.VDDyC_mSxIE>> 3 pages.

Preuveneers et al., "SAMURAI: A Streaming Multi-tenant Context-Management Architecture for Intelligent and Scalable Internet of Things Applications," In Proceedings International Conference on Intelligent Environments, Published Jun. 30, 2014, retrieved at <<https://distrinet.cs.kuleuven.be/news/2014/images/samurai.pdf>> 8 pages.

Sharon et al., "Event Processing Network—A Conceptual Model," In Proceedings of the 33rd International Conference on Very Large Data Bases, published Sep. 23, 2007, retrieved at <<http://citeseerx.ist.psu.edu/viewdoc/download;jsessionid=0025262ACBB66543318F01FE71F7A80D?doi=10.1.1.98.2802&rep=rep1&type=pdf>> 9 pages.

Tan et al., "Meteor," retrieved on Oct. 10, 2014, at <<https://www.meteor.com/main>> 2 pages.

The Event Processing Manifesto, In Proceedings of Dagstuhl Seminar 10201, published May 16, 2010, retrieved at >>http://drops.dagstuhl.de/opus/volltexte/2011/2985/pdf/10201.SWM.2985.pdf>> 60 pages.

The Future of Real-Time Marketing Starts Now, retrieved on Oct. 1, 2014 at >>http://www.tibco.com/products/cloud/real-time-marketing TIBCO Engage(TM) is a real-time cloud-based marketing platform>> 3 pages PCT Search Report and Written Opinion dated Mar. 3, 2016 for PCT Application No. PCT/US2015/062881, 10 Pages.

* cited by examiner

CONTEXT-DRIVEN MULTI-USER COMMUNICATION

BACKGROUND

Computing devices such as personal computers, smartphones, and tablets may serve as user portals to access a variety of multi-user systems, such as online technical-support systems, multi-user gaming systems, and other multi-user systems. Such computing devices may communicate with servers of the multi-user systems to convey information between users of the system. Multi-user systems are generally configured to provide access to stored information based on users' memberships in system-defined user groups. This may inconvenience users, who may be unable to access desired information or may be required to transfer or search through large volumes of available information to find desired information. Additionally, users may be required to provide the same information multiple times when interacting with the system.

SUMMARY

This disclosure describes techniques for managing context and queries in a multi-user system. Techniques described herein may replicate context between computing device(s) or transmit queries to be executed on appropriate computing device(s). Some techniques herein may reduce bandwidth use and processor load, while improving user efficiency at locating desired information.

In some examples, a content-driven multi-user system may include distributed computing resource(s), e.g., replication servers, that replicate proper subset(s) of user-relevant context data to computing device(s), e.g., replication clients. An example method may include storing context data on the replication server, the context data related to interaction(s) of one or more user(s) with or via the multi-user system. An update record may be received at the distributed computing resource(s), e.g., at a replication server. The update record may correspond to stored context data, which may be modified based at least in part on the update record. Propagation records may be determined based at least in part on the received update record. Each propagation record may correspond to a respective, different proper subset of the context data. The propagation records may be transmitted, e.g., to respective replication clients. An example replication client may be configured to receive a propagation record and modify local context data in response. Determining and transmitting propagation records may reduce bandwidth use and increase security by providing each computing device with only data required by or approved for access by that computing device. Transmitting propagation records in response to received update records may reduce latency of accessing information by storing the information in computing device(s) before user(s) of those device(s) request access to that information.

In some examples, a computing device such as a replication client may receive a data record via a user interface thereof and determine an update record in response and using the local context data. The computing device may transmit the determined update record.

An example server may be configured to receive a query specification referencing one or more of a plurality of data sources, select an indication of a proper subset of the context data based at least in part on the received query specification, and transmit the query specification to a replication client of the multi-user system corresponding to the selected one of the subset indications, e.g., to a computing device holding input data of the specified query. This may reduce network bandwidth use by reducing the amount of data to be transferred between computing devices to assemble the inputs of the query.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
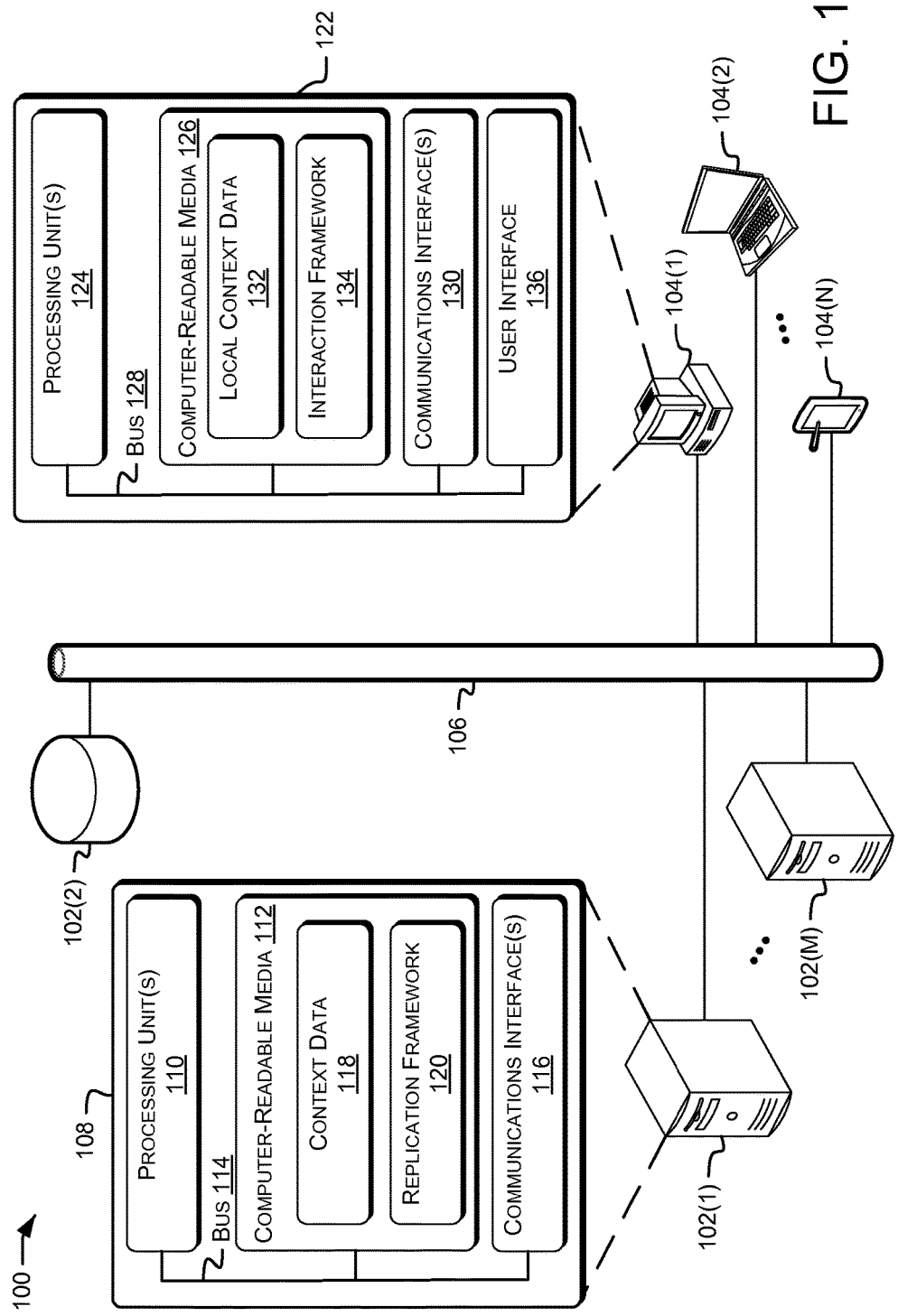
FIG. 1 is a block diagram depicting an example environment for implementing context management or context-driven processing according to some examples described herein.

Examples described herein provide techniques and constructs to replicate database subsets between computing devices in a multi-user system ("context management"), and to distribute database queries between computing devices ("query management"). Context management may provide users with desired information while reducing the need to transfer or process information that is not desired or pertinent. Query management may improve the speed and efficiency of database searches or other queries by causing such queries to be performed on computing devices in the multiuser system on which input data is readily available.

Examples described herein manage "context." As used herein, the term "context" refers to information stored or controlled by the multi-user system that may be relevant to interaction(s) of one or more user(s) with or via the multi-user system. By way of example and not limitation, context data may include information about products and/or services of users, user preference information relating to the products and/or services, historical information about the user's previous interactions via the multi-user system, actions that were taken by the multi-user system in response to such interactions, etc. The interaction(s) may be between users, whether the users access the system concurrently or spaced apart in time. The interaction(s) may also be between one or more users and a service provided by the system, e.g., automated account management. Users of the system may be humans or computing devices executing automated "agent" software to perform predetermined functions.

Each user of the multi-user system has access to a respective proper subset of (i.e., less than all of) the context data, and may replicate (copy) that proper subset onto a computing device that user is using to access the multi-user system. "Local context data" refers to a copy of a proper subset of the context data. Local context data are resident on users' computing devices. A user's proper subset may change in scope over time, depending on activities of that user or other users of the multi-user system. Providing proper subsets gives each user access to relevant information without reduced bandwidth and processor load compared to replicating the context data itself.

The multi-user system may provide substantially real-time "push" updates to local context data. This may help to ensure that each user of the multi-user system has timely access to the context information relevant to that user's role, and may also reduce latency in the system. For example, when user Alice changes an element of Alice's local context data, Alice's computing device may communicate that change to servers of the multi-user system. The servers may then propagate that change or consequences of that change to user Bob's computing device. The multi-user system may provide propagation in reverse to update Alice's computing device with changes made by Bob. Updating user Alice's proper subset in response to user Bob's activity may reduce latency for, e.g., database queries that Alice runs on Bob's data. For such a query that may retrieve Bob's data from Alice's proper subset, Alice does not have to wait for the data to be retrieved from Bob before running the query.

Additionally, latency may be further reduced by, e.g., permitting Alice and Bob to share data over links to servers connected by high-speed connections rather than over slower direct connections between each other's computing devices. In some examples, Alice communicates with a server near her computing device, physically or across the network (e.g., low hop count or round-trip time) and Bob communicates with a server near his computing device, physically or across the network. The servers may be connected via a backbone or other high-bandwidth connection. Bidirectional propagation may permit Bob and Alice to share data nearly in real-time.

Latency may be further reduced by updating the local context data and user interface of Alice's computing device based on Alice's actions before or in parallel with updates to the context data based on Alice's actions, and likewise for Bob's computing device based on Bob's actions. Any inconsistencies between Alice's local context data and Bob's local context data may be reconciled via compensating changes provided by the multiuser system. This may permit multi-user communication with reduced overhead and latency compared to conventional databases that use the conventional ACID (Atomicity, Consistency, Isolation, and Durability) transaction model. Using compensating changes instead of the ACID model may also permit the multi-user system to support more total users, or more concurrent users.

Users may desire to run database queries against their proper subsets. In some examples, the multiuser system manages such queries by transferring the queries to other computing devices to be executed. For example, if Alice and Bob share data regarding Alice's favorite songs, Bob may wish to periodically run a query for new favorites of Alice's. The multiuser system may manage that query by transferring the query to Alice's computing device. Since favorite-song information is added to Alice's local context data before being replicated, the query may be efficiently run before or in parallel with the replication of new-favorite data to servers. This may reduce latency of query execution, providing Bob with information sooner than would be possible if the query executed on Bob's computing device after replication was complete.

In some examples, users' devices, servers, or other components of the multi-user system may include rules that trigger in response to specified changes to the context data or local context data. For example, business rules may be implemented that are activated when certain conditions are present in the context data, with respect to any individual user or with respect to a group of users. Rule-triggered components may modify the context data or take other actions. In some examples, rule-triggered components may use machine learning to detect patterns in the context data. This may permit detecting commonalities across groups of users, permitting user interfaces to be streamlined for common tasks performed by that group of users.

Throughout this disclosure, for the sake of clarity, a nonlimiting example is presented of a customer seeking support with a product (the "customer-support example"). In this example, the context-driven multiuser system is a system accessible via the Internet or another network that permits customers and support technicians to communicate. In this example, customers and support technicians are users of the multi-user system. The context-driven multiuser system may include features assisting the technicians in solving customer problems, e.g., problem logging, ticket tracking, or remote-login capabilities. Additionally or alternatively, the context-driven multiuser system may include features associated with presenting customers with information and options that reflect the user's context information.

Some prior schemes have copied whole datasets between servers. However, such copying may consume significant bandwidth and time. In some examples herein, replicating only specific context subsets may provide secure access to common information with reduced latency and network load. Replication of context subsets may also permit replication onto devices having limited storage, such as smartphones, smart watches, or other client devices.

Some algorithms for propagating context updates may include receiving an update record corresponding to stored context data. A plurality of propagation records may be determined based at least in part on the received update record. Each of the propagation records may correspond to a respective, different proper subset of the stored context data. The plurality of propagation records may be transmitted via one or more communications interfaces. In some examples, a computing device may receive the propagation record via a communications interface. The computing device may then modify the local context data based at least in part on the received propagation record.

The computing device may further receive a data record, e.g., from a user interface. The computing device may determine an update record based at least in part on the data record and the local context data. The computing device may then transmit the determined update record via the communications interface. This may provide bidirectional updates and replication of the context data subsets.

In some examples of query management, a replication controller or other computing device may include computer storage media having thereon the context data and a plurality of subset indications, each identifying a respective proper subset of the context data. Processing units may execute instructions to receive a query specification and select one of the subset indications based at least in part on the received query specification. The processing units may further execute instructions to transmit the received query specification and identifying information of the selected subset indication via the communications interface, e.g., to a computing device that may handle the query.

Some environments, configurations of computing devices, and methods for context management or query management are described further with reference to FIGS. 1-15. While many examples described herein relate to servers and desktops, or to smartphones and other portable computing devices, other types of computing devices or distributed computing resources may be used, e.g., as discussed with reference to FIG. 1.

Illustrative Environment

FIG. 1 shows an example environment 100 in which context-management or other context-driven systems may operate and in which context-updating methods, query-management methods, and other methods such as those described herein may be performed. The illustrated components may be components of a context-driven multi-user system, as described herein. In the illustrated example, some devices and/or components of environment 100 include distributed computing resources 102(1)-102(M) (e.g., computing devices, individually or collectively referred to herein with reference 102), where M is any integer greater than or equal to 1. Distributed computing resources 102 may communicate with one another and with computing devices 104(1)-104(N) (e.g., computing devices, individually or collectively referred to herein with reference 104), where N is any integer greater than or equal to 1, via one or more networks 106. Although illustrated as desktop computers, laptop computers, tablet computers, or mobile phones, distributed computing resources 102 and/or computing device(s) 104 may include a diverse variety of device types and are not limited to a particular type of device.

By way of example and not limitation, distributed computing resources 102 may include, but are not limited to, server computers such as Web servers (e.g., 102(1)), storage systems such as database servers (e.g., 102(2)), or other servers, including servers operated by remote- or cloud-computing services such as MICROSOFT AZURE or AMAZON WEB SERVICES. Computing device(s) 104 may include, but are not limited to, desktop computers (e.g., 104(1)), laptop computers, thin clients, terminals, or other mobile computers (e.g., 104(3)), smartphones, mobile phones, tablet computers, mobile phone-tablet hybrid devices, personal data assistants (PDAs), or other telecommunication devices (e.g., 104(N)), automotive computers such as vehicle control systems, vehicle security systems, or electronic keys for vehicles, portable or console-based gaming devices or other entertainment devices such as network-enabled televisions, set-top boxes, media players, cameras, or personal video recorders (PVRs), computer navigation client computing devices, satellite-based navigation system devices including global positioning system (GPS) devices and other satellite-based navigation system devices, wearable computers such as smart watches or biometric or medical sensors, implanted computing devices such as biometric or medical sensors, integrated components for inclusion in computing devices, appliances, or other computing device(s) configured to participate in or carry out context management as described herein, e.g., for replication and data-access purposes, or query management as described herein, e.g., for efficiency in processing data.

Different devices or types of devices may have different context-management query-management schemes or needs. For example, portable computing devices may regularly connect to and disconnect from networks. Such devices may require high burst bandwidth to replicate small sets of local context data quickly while connected. Such devices may save changes in the local context data when disconnected so that those changes may be replicated to other users once the device is connected. Desktop computers such as office computers generally have stable network connections, so may require low latency for real-time interaction more than they require burst bandwidth.

In some examples, distributed computing resource(s) 102 may implement one or more replication controller(s). In some of these examples, computing device(s) 104 may implement replication client(s) that provide data to or receive data from the replication controller(s). Replication controller(s) cooperate with modules on computing device(s) 104 to provide computing device(s) 104 access to respective proper subsets of a common set of context data 118. Throughout this disclosure, computing devices 104 may have respective, different proper subsets, as discussed below with reference to local context data 132. A proper subset may differ from another proper subset in the presence, absence, or value of one or more items of data. Throughout this disclosure, administrators of the multi-user system may have access to the entirety of context data 118 via their computing device(s) 104. Discussion of "users" herein does not include administrators acting in a role in which they have such access.

In some examples, computing devices 104 may communicate with each other, with distributed computing resources 102, or with other computing devices via network(s) 106.

For example, network(s) 106 may include public networks such as the Internet, private networks such as an institutional or personal intranet, or combination(s) of private and public networks. Network(s) 106 may also include any type of wired or wireless network, including but not limited to local area networks (LANs), wide area networks (WANs), satellite networks, cable networks, WI-FI networks, WiMAX networks, mobile communications networks (e.g., 3G, 4G, and so forth) or any combination thereof. Network(s) 106 may utilize communications protocols such as, for example, packet-based or datagram-based protocols such as internet protocol (IP), Transmission Control Protocol (TCP), User Datagram Protocol (UDP), other types of protocols, or combinations thereof. Moreover, network(s) 106 may also include a number of devices that facilitate network communications or form a hardware infrastructure for the networks, such as switches, routers, gateways, access points, firewalls, base stations, repeaters, backbone devices, and the like. Network(s) 106 may also include devices that facilitate communications between computing devices 104 using bus protocols of some topologies, e.g., crossbar switches, INFINIBAND switches, or FIBRE CHANNEL switches or hubs.

Different networks have different characteristics, e.g., bandwidth, latency, accessibility (open, announced but secured, or not announced), or coverage area. The timing and data rate of replication transfers (e.g., update records and propagation records, discussed below) may be adjusted depending on the characteristics of the particular network to which a given computing device is connected.

In some examples, network(s) 106 may further include devices that enable connection to a wireless network, such as a wireless access point (WAP). Examples support connectivity through WAPs that send and receive data over some electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof. Other examples support wired connectivity through routers, switches, or hubs that support IEEE 802.3 ETHERNET standards, point-to-point links that support RS-232 standards, or network interfaces that support IBM TOKEN RING or IEEE-488 standards, among others, or multiples or combinations thereof.

Details of an example distributed computing resource 102(1) are illustrated at inset 108. The details of example distributed computing resource 102(1) may be representative of others of distributed computing resource(s) 102. However, each of the distributed computing resources 102 may include additional or alternative hardware and/or software components. Still referring to the example of FIG. 1, distributed computing resource 102(1) may include one or more processing unit(s) 110 operably connected to one or more computer-readable media 112 such as via a bus 114, which in some instances may include one or more of a system bus, a data bus, an address bus, a PCI bus, a Mini-PCI bus, a Peripheral Component Interconnect Express (PCIe) bus, and any variety of local, peripheral, or independent buses, or any combination thereof. In some examples not shown, one or more of the processing unit(s) 110 in one of the distributed computing resource(s) 102 may be operably connected to computer-readable media 112 in a different one of the distributed computing resource(s) 102, e.g., via a communications interface 116 (discussed below) and network 106.

In some examples, plural processing units 110 may exchange data through bus 114 rather than or in addition to network 106. While processing units 110 are described as residing on a single distributed computing resource 102, different processing units 110 may also reside on different distributed computing resources 102 in some examples. In some examples, at least two processing units 110 may reside on respective, different distributed computing resources 102. In such examples, multiple processing units 110 on the same distributed computing resource 102 may use bus 114 of that distributed computing resource 102 to exchange data, while processing units 110 on different distributed computing resources 102 may exchange data via network(s) 106.

Processing unit(s) 110 may be or include one or more single-core processors, multi-core processors, central processing units (CPUs), graphics processing units (GPUs), general-purpose graphics processing units (GPGPUs), or hardware logic components configured, e.g., via programming from modules or APIs, to perform functions described herein. For example, and without limitation, illustrative types of hardware logic components that may be used in or as processing units 110 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 110 may represent a hybrid device, such as a device from ALTERA or XILINX that includes a CPU core embedded in an FPGA fabric. These or other hardware logic components may operate independently or, in some instances, may be driven by a CPU. In some examples, at least some of distributed computing resource(s) 102(1)-102(M) may include a plurality of processing units 110 of multiple types. For example, processing units 110 in distributed computing resource 102(1) may include a combination of one or more GPGPUs and one or more FPGAs.

Computer-readable media 112 may store, for example, context data 118, module(s) holding executable instructions of an operating system (omitted for brevity) and a replication framework 120, and other modules, programs, or applications that are loadable and executable by processing unit(s) 110. For example, program code (e.g., stored SQL or LINQ queries) to perform operations of flow diagrams herein may be downloaded from a server, e.g., distributed computing resource 102(1), to a database server, e.g., distributed computing resource 102(2), e.g., via network 106, and executed by one or more processing unit(s) 110 in distributed computing resource 102(1).

Computer-readable media described herein, e.g., computer-readable media 112 and computer-readable media 126 (discussed below), includes computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage devices, and/or storage media that may be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media.

In some examples, computer-readable media 112 may store instructions executable by processing unit(s) 110 that, as discussed above, may represent a processing unit incorporated in distributed computing resource 102. Computer-readable media 112 may additionally or alternatively store instructions executable by external processing units such as by an external CPU or external processor of any type discussed above. In some examples at least one processing unit 110, e.g., a CPU, GPU, or hardware logic device, is incorporated in distributed computing resource 102, while in some examples at least one processing unit 110, e.g., one or more of a CPU, GPU, or hardware logic device, is external to distributed computing resource 102.

Distributed computing resource 102 may also include one or more communications interfaces 116 to enable wired or wireless communications between distributed computing resource 102 and other networked distributed computing resources 102 involved in context management or query management, or other distributed computing resource(s) or computing devices 104, over network(s) 106. Such communications interface(s) 116 may include one or more transceiver devices, e.g., network interface controllers (NICs) such as Ethernet NICs or other types of transceiver devices to send and receive communications over a network. Communications interfaces 116 and other communications interfaces described herein may be single- or multi-homed and may include any number of ports. Processing units 110 may exchange data through respective communications interface(s) 116. In some examples, communications interface 116 may be a PCIe transceiver, and the network 106 may be a PCIe bus. In some examples, communications interface 116 may include, but is not limited to, a transceiver for cellular (3G, 4G, or other), WI-FI, Ultra-wideband (UWB), BLUETOOTH, or satellite transmissions. Communications interface 116 may include a wired I/O interface, such as an Ethernet interface, a serial interface, a Universal Serial Bus (USB) interface, an INFINIBAND interface, or other wired interfaces. For simplicity, these and other components are omitted from the illustrated distributed computing resource 102.

Details of an example computing device 104(1) are illustrated at inset 122. The details of example computing device 104(1) may be representative of others of computing device(s) 104. However, each computing device 104 may include additional or alternative hardware and/or software components. Still referring to the example of FIG. 1, computing device 104(1) may include one or more processing unit(s) 124 operably connected to one or more computer-readable media 126 such as via a bus 128, which may include any type discussed above with reference to bus 114. In some examples not shown, one or more of the processing unit(s) 124 in one of the computing device(s) 104 may be operably connected to computer-readable media 126 in a different one of the computing device(s) 104, e.g., via a communications interface 130 (discussed below) and network 106.

In some examples, plural processing units 124 may exchange data through bus 128 rather than or in addition to network 106. While the processing units 124 are described as residing on a single computing device 104, the processing units 124 may also reside on different computing devices 104 in some examples. In some examples, at least two of the processing units 124 may reside on different computing devices 104. In such examples, multiple processing units 124 on the same computing device 104 may use bus 128 of that computing device 104 to exchange data, while processing units 110 on different computing devices 104 may exchange data via network(s) 106. Processing unit(s) 124 may be or include any of the types listed above with reference to processing unit(s) 110. For example, the processing units 124 in computing device 104(1) may be a combination of one or more microcontrollers and one or more ASICs.

Computer-readable media 126 may store, for example, local context data 132 (discussed below) and executable instructions of an operating system (omitted for brevity), an interaction framework 134, and other modules, programs, or applications that are loadable and executable by processing unit(s) 124. For example, program code to perform operations of flow diagrams herein may be downloaded from a server, e.g., distributed computing resource 102(1), to a client, e.g., computing device 104(1), e.g., via network 106, and executed by one or more processing unit(s) 124 in computing device 104(1). In some examples, distributed computing resource 102(1) includes a Web server, computing device 104(1) includes a Web browser with a JAVASCRIPT or other code-execution engine, and the Web browser downloads and executes code provided by the Web server. Such code may include, for example, user interface code for a distributed application including code running on both distributed computing resource 102(1) and computing device 104(1).

Local context data 132 is a proper subset of context data 118, and is sometimes referred to as a "projection" of context data 118. Any number of computing device(s) 104 may communicate with distributed computing resource(s) 102 having particular context data 118. Each of the computing device(s) 104 may replicate in its respective local context data 132 a subset of context data 118 that may be the same as, or different from, the subset for any other of computing device(s) 104. In examples using SQL or other table/record/column databases, each set of local context data 132 may include, e.g., fewer than all columns, fewer than all records, or fewer than all tables in context data 118. The contents of each set of local context data 132 may be selected based on attributes of the database (e.g., only selected columns), based on attributes of the data (e.g., only rows having certain values or ranges of values in selected columns, even if all columns of those rows are returned), or any combination thereof.

In some examples, replication framework 120 may be executed on computing device(s) 104. In some examples, interaction framework 134 may be executed on distributed computing resource(s) 102. For example, in a machine-room or datacenter monitoring application, replication framework 120 may be executed on a tablet or laptop computer and interaction framework 134 may be executed on a rack-mounted server. This and other examples are discussed below.

In some examples, computer-readable media 126 may store instructions executable by the processing unit(s) 124 that, as discussed above, may represent a processing unit incorporated in computing device 104. Computer-readable media 126 may additionally or alternatively store instructions executable by external processing units, such as discussed above with reference to computer-readable media 112. In some examples at least one processing unit 124, e.g., a CPU, GPU, or hardware logic device, is incorporated in computing device 104, while in some examples at least one processing unit 124, e.g., one or more of a CPU, GPU, or hardware logic device, is external to computing device 104.

Computing device 104 may also include one or more communications interfaces 130 to enable wired or wireless communications between computing device 104 and other networked computing devices 104 involved in context management or query management, or other computing device(s), over network(s) 106. Such communications interface(s) 130 and networks 106 in communication therewith may include any of the types of devices or networks discussed above with reference to communications interface 116. The processing units 124 may exchange data through respective communications interface(s) 130. For brevity, these and other components are omitted from the illustrated computing device 104.

Computing device 104 may also include a user interface 136. User interface 136 may include one or more integral and/or peripheral output devices, configured for communication to a user or to another computing device (not shown) related to the user. Examples of output devices may include a display, a printer, audio speakers, beepers, or other audio output devices, a vibration motor, linear vibrator, or other haptic output device, and the like.

User interface 136 may include one or more integral and/or peripheral input devices. The peripheral input devices may be user-operable, or may be configured for input from other computing devices. Examples of input devices may include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, other auditory input, a touch input device, a gestural input device such as a touchscreen, an accelerometer, a grip sensor, or other haptic input, and the like.

Illustrative Components

Figure 2:
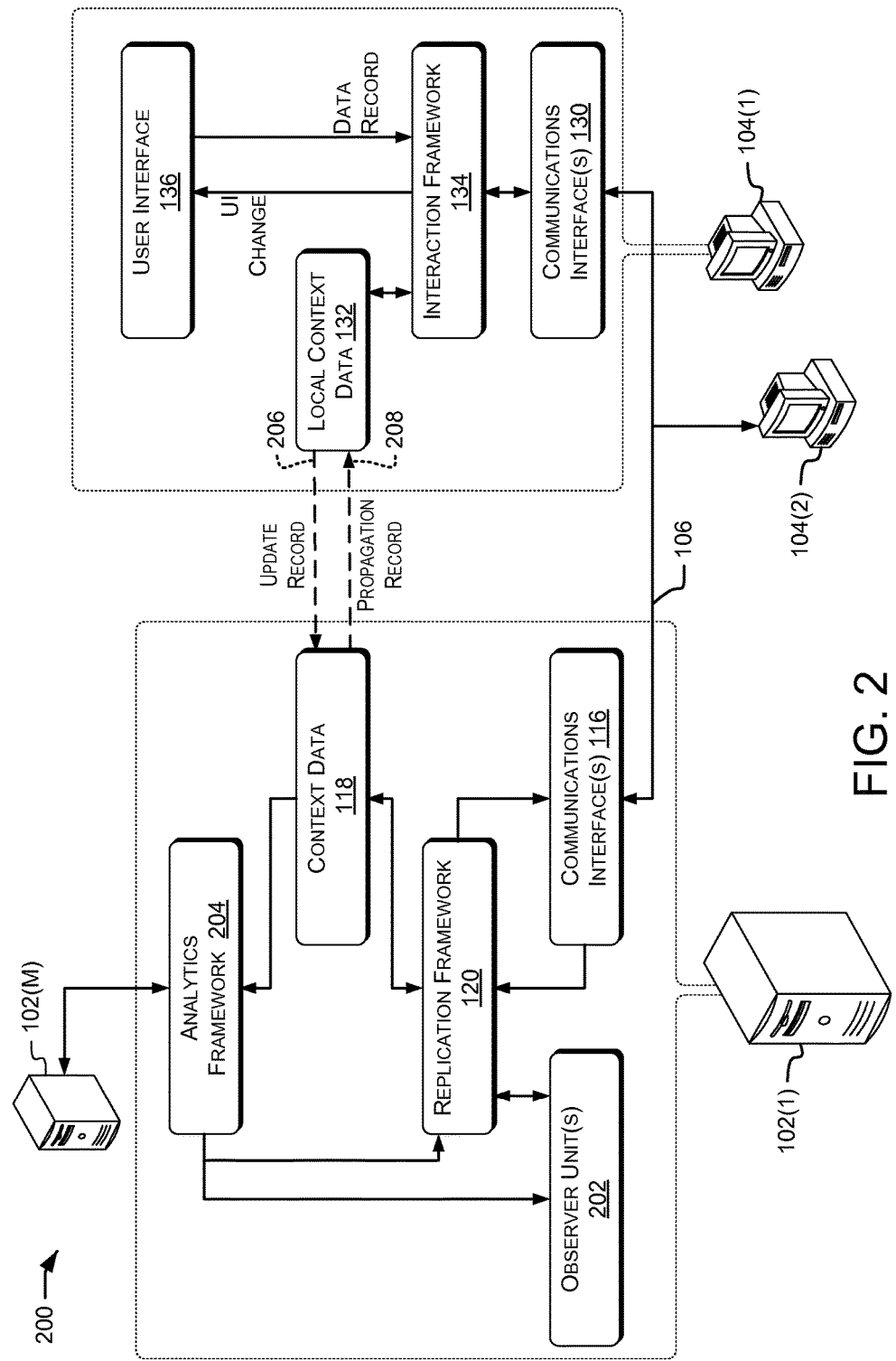
FIG. 2 is a block diagram that illustrates an example technique for implementing a context-driven multiuser system according to some examples described herein.

FIG. 2 is a block diagram that illustrates an example technique 200 for implementing a context-driven multiuser system. The example technique 200 may include a replication framework 120 and an interaction framework 134. The replication framework 120 may be implemented using a distributed computing resource 102, as discussed above with reference to FIG. 1. The interaction framework 134 may be implemented using a computing device 104, as discussed above with reference to FIG. 1. Distributed computing resource 102 and computing device 104 may intercommunicate via respective communications interfaces 116, 130.

In the customer-support example introduced above, the customer is using computing device 104(1) to request support and a customer-support technician is using computing device 104(2) to provide support. Computing device 104(2) may include components described herein with reference to computing device 104(1) that, for brevity, are not shown. Computing devices 104(1), 104(2) are connected to network 106 and configured to intercommunicate via distributed computing resource 102. Other configurations are possible, and additional examples are described herein.

The multiuser system is context-driven. That is, computing devices 104(1), 104(2) have substantially real-time access to respective portions of a context, as described above. One of the computing devices 104(1), 104(2) may modify the context, e.g., by adding, removing, or altering information in the database. The modifications are then visible to the other of the computing devices 104(1), 104(2) substantially in real time. The context may be stored and managed by distributed computing resources 102.

In the customer-support example and other examples, interaction framework 134 of computing device 104(1) receives a request for support via user interface 136. For example, a user may access a support Web site using a Web browser, or launch a support application or smartphone app. The request is received by interaction framework 134. As used herein, the term "data record" refers to data provided to interaction framework 134, e.g., by user interface 136 or via communications interface(s) 130, that may be used or useful to modify local context data 132.

Continuing the customer-support example, in response to the data record indicating the user has accessed a support Web site, interaction framework 134 determines whether local context data 132 should be modified and makes any appropriate modifications. Interaction framework 134 may additionally or alternatively make any desired changes to the form or contents of user interface 136, e.g., triggered by modifications to local context data 132. For example, interaction framework 134 may, when the user navigates to a support Web site, modify local context data 132 with the date and time of the request and change the form or content of user interface 136 to indicate that the requested page is loading (e.g., by displaying a progress bar or spinner). Interaction framework 134 determines whether any of the changes to local context data 132 should be replicated to other devices, and transmits any appropriate update records via communications interface 130. For example, interaction framework 134 may transmit update records including context information about the received request for the support Web page and about the identity of the user requesting support.

Distributed computing resource 102 receives update record(s) from computing devices 104 and passes them to replication framework 120. Replication framework 120 determines whether context data 118 should be modified and, if so, makes appropriate modifications. For example, replication framework 120 may record the context information about the received request for the support Web page.

In response to changes in context data 118, or in response to data transmission or reception via communications interface 116, replication framework 120 may activate one or more observer unit(s) 202. Observer unit(s) 202 may include computer program instructions or logic executing on the same distributed computing resource 102 as replication framework 120, or on different distributed computing resource(s) 102. Replication framework 120 may communicate with observer unit(s) 202 via, e.g., communications interface 116, procedure calls, e.g., to dynamically-linked libraries, or an interprocess communication (IPC) or remote procedure call (RPC) subsystem of distributed computing resource(s) 102. Observer unit(s) 202 may be implemented as software plugins, e.g., in MICROSOFT .NET languages such as C# or languages such as JAVASCRIPT.

An observer unit 202 may respond to information from selected source(s), of selected type(s), having selected value(s) or range(s) of value(s), or any combination of those. The criteria to which an observer unit 202 responds are referred to herein as its "trigger conditions." Each observer unit 202 may specify its own trigger conditions, or multiple observer units 202 may share trigger conditions. Each observer unit 202 may additionally or alternatively specify its own input criteria. "Input criteria" indicate which data the corresponding observer unit 202 expects to receive for processing. Each observer unit 202 may specify its own input criteria, or multiple observer units 202 may share input criteria. In an example, the input criteria include a database query to be executed against stored context data 118, and the corresponding trigger condition is that the database query returns at least one row (i.e., at least some data in context data 118 matches conditions set forth in the database query).

An observer unit 202 may take any desired action in response to information meeting the trigger conditions of that observer unit 202. In some examples, observer unit 202 may request replication framework 120 modify context data 118 in response to received information. This requesting of modifications permits changes in context data 118 to trigger other changes in context data 118. The response to a specific change in context data 118 may vary depending on which observer unit(s) 202 are operatively coupled to replication framework 120 at any given time.

Figure 3:
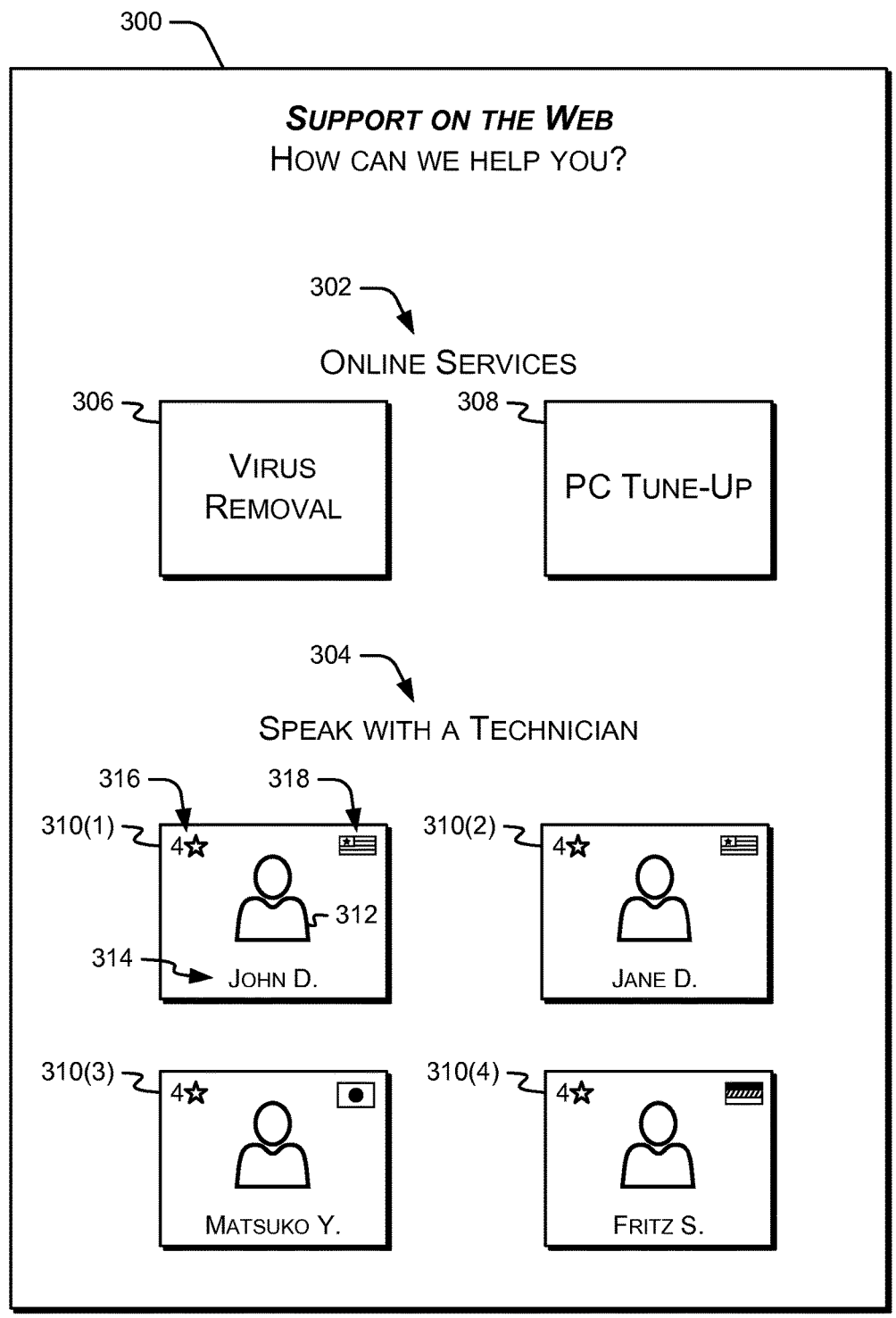
FIG. 3 a graphical representation of an example customer-support user interface according to some examples described herein.

In the customer-support example, an observer unit 202 may trigger in response to receipt of a support request. That observer unit 202 may access context data 118 corresponding to the user submitting the request. Context data 118 may include information about preferences or background of that user. Observer unit 202 may determine how the requested support Web page should be presented based on the information about preferences or background. Observer unit 202 may then transmit the requested support Web site, with the determined presentation, to computing device 104(1). Additionally or alternatively, observer unit 202 may modify context data 118 to indicate the determined presentation. A Web server (e.g., running on distributed computing resource 102 or another server) may retrieve the determined presentation from context data 118, e.g., using an observer unit 202 with trigger conditions including modifications to determined presentations of Web pages. The Web server may then transmit the requested support Web site, with the determined presentation, to computing device 104(1). An illustration of this example is shown in FIG. 3, discussed below.

In some examples, replication framework 120 includes or is operatively connected with analytics framework 204. Analytics framework 204 may perform analysis of context data 118 or other information outside the context of a particular set of trigger conditions. For example, analytics framework 204 may collect changes to context data 118 or point-in-time samples of context data 118 and perform machine learning to determine new or modified trigger conditions for one or more observer units 202. For brevity, internal details of analytics framework 204 are not shown in FIG. 2. Analytics framework 204 may perform processing internally, request processing from distributed computing resource 102(M), or any combination thereof.

Analytics framework 204 may be implemented as special-purpose code, or using one or more observer units 202. For example, analytics framework 204 may include a recording observer unit 202 that triggers on selected changes to context data 118 and copies or summarizes relevant portions of context data 118 into offline storage, e.g., distributed computing resource 102(2), which represents a database server. Analytics framework 204 may also include an updating observer unit 202 that receives new or updated trigger conditions, e.g., from a machine-learning engine (not shown), and transmits the conditions to other, relevant observer units 202 for processing, or requests replication framework 120 to modify context data 118 according to the new conditions.

In some examples, each computing device 104 holds less than all of context data 118 in local context data 132 of that computing device 104. In the customer-support example, the user's computing device 104(1) may store local context data 132 including the dates and times of service requests made by that user. The technician's computing device 104(2) may store local context data 132 including that user's service history, the service history of computing device 104(1) (e.g., if computing device 104(1) has had more than one owner), sales information of products purchased by that user that may be pertinent to the user's request for support, and information from other users that have had problems similar to that experienced by the requesting user.

Requests to modify context data 118, e.g., due to requests from observer unit(s) 202 or analytics framework 204, or due to data exchange via communications interface(s) 116, are referred to herein as "update records." Upon receipt of an update record, replication framework 120 may determine one or more propagation record(s), e.g., corresponding to respective computing device(s) 104. Replication framework 120 may then transmit the propagation record(s) to the respective computing device(s) 104. Continuing the customer-support example, when the user requests support, that request is logged in context data 118. Replication framework 120 then transmits propagation record(s) to computing device(s) 104 corresponding to relevant support technicians. Those computing device(s) 104 log the request in respective local context data 132. Transmitting propagation records may reduce the time support technicians spend looking for information, increasing efficiency of interactions between users and support technicians. Transmitting propagation records to computing device(s) 104 rather than full update records may reduce network bandwidth by transmitting only the information that each particular computing device 104 may make use of. For example, computing device(s) 104 used by sales personnel may store, in local context data 132, information about a user's acquaintances or friends. Computing device(s) 104 used by support technicians would not need such information, so not transmitting that information to such devices may reduce bandwidth usage.

In some examples, context modifications (replication) are transmitted bidirectionally between distributed computing resource(s) 102 and computing device(s) 104. This is represented graphically by the dashed arrows in FIG. 2. Arrow 206 represents an update record, i.e., data transferred, e.g., on the initiative of computing device 104(1), to a distributed computing resource 102 to modify context data 118, as discussed above. This data may include "pull" data (viewed from the perspective of computing device 104(1)), e.g., data transferred with a Hypertext Transfer Protocol (HTTP) request from computing device 104(1) for a Web page. Arrow 208 represents data transferred, e.g., on the initiative of distributed computing resource 102. This data may include "push" data, e.g., transferred via a Web Sockets connection. As used herein, a "propagation record" includes data from a distributed computing resource 102 transmitted to a computing device 104 to modify local context data 132. In some examples, local context data 132 includes only a proper subset of context data 118, as discussed above. Arrows 206, 208 do not represent direct connections between context data 118 and local context data 132. Instead, arrows 206, 208 illustrate bidirectional flow of information in some examples and illustrate terms used herein.

Communications via communications interfaces 116, 130 may use various protocols or formats, e.g., RPC-based Web Services such as SOAP services, REST-style Web services, Web Sockets, Transmission Control Protocol (TCP), User Datagram Protocol (UDP), NetBIOS, or other protocols. Authentication, encryption, and authorization standards such as Secure Sockets Layer (SSL), OData, OAuth2, and OpenID may also be used. In some examples, update records are transferred using REST-style Web services. In some examples, propagation records are transferred using Web Sockets connections.

In some examples, one or more of interaction framework 134, replication framework 120, or observer unit(s) 202 include internal data filter components, e.g., connected by data pipe components. For example, observer unit(s) 202 may include search filters that scan context-data modifications from replication framework 120 for relevant events, transformation filters that produce new values from values in the modifications, and output filters that format new values for inclusion in context data 118. Filters may include filters configured to process particular structures of data in context data 118 or local context data 132. Interaction framework 134 may include filters to select which data records result in update records, and separate filters to select which data records trigger user-interface changes. In some examples, data filter components and data pipe components are implemented using MICROSOFT REACTIVE EXTENSIONS ("Rx") or other implementations of the Observer design pattern.

In some examples, the context-driven multi-user system may include observer units 202 or interaction framework(s) 134 implementing triggering logic using data pipe components and data filter components (the "pipes and filters" design pattern). When data is replicated from local context data 132 to context data 118 via update records, or from context data 118 to local context data 132 via projection records, the replicated data may be provided to data filter components in processing pipelines. Filter components in these processing pipelines may respond to selected changes to provide additional or modified data for inclusion in context data 118 or local context data 132. In some examples, an observer unit 202 may include a processing pipeline responsive to changes in Alice's favorite-songs list to compute statistics of which genres of music Alice prefers. Those statistics may be added to context data 118, from which they may be replicated to Bob's local context data 132. Bob may then use the statistics to select a birthday present for Alice. In some examples, interaction framework 134 may include a processing pipeline responsive to replication of the statistics to determine whether Alice's musical taste has shifted significantly since the last time Bob bought her an album, and to inform Bob via user interface 136 if so.

In some examples, the context-driven multi-user system provides geographically-localized information such as weather alerts. Distributed computing resource 102 includes a server, e.g., a Web server, configured to generate and transmit the alerts. Computing devices 104, e.g., smartphones, are configured to receive and display the alerts. The context may include per-user records of when a given user requested weather information or alerts, when alerts were delivered to that user, where that user was located when making such requests or receiving such alerts (e.g., GPS location data of a user's smartphone), the type of each alert, whether that user requested additional information related to a given alert, e.g., by clicking on a toast notification, or where the user normally resides. Observer unit(s) 202 or analytics framework 204 may respond to the context and to update records by modifying context data 118 or trigger conditions so that weather alerts will be sent only in conformance with each user's particular preferences.

For example, a user who lives in North Dakota may not want snowstorm alerts in the winter, since that user generally expects high snow. However, when a user who lives in Arizona visits North Dakota, snowstorm alerts may be more useful to that user. Similarly, a user who lives in Arizona may not want high-heat warnings in Arizona, but a user who lives in North Dakota may want high-heat warnings when visiting Arizona. Accordingly, an example observer unit 202 may respond to context data indicating those alerts for which a user requested additional information. The example observer unit 202 may predict whether the user is more interested in snowstorm alerts or high-heat warnings, and store that prediction in context data 118, from which the prediction may be replicated to local context data 132 of the user's computing device(s) 104. A computing device 104 may then retrieve the projection from local context data 132 and display only weather alerts indicated by the prediction. Similarly, context data 118 may include a frequency of weather alerts, e.g., one per day by default. An example observer unit 202 may override the normal frequency to cause alerts to be sent upon issuance of a tornado warning for the user's area, regardless of whether the user has already received a weather alert. Another example observer unit 202 may respond to a request from a user for weather information, when that user is located more than, e.g., 100 miles from that user's residential address, by modifying context data 118 to indicate that the user should receive alerts related to the user's present location and not the user's home location. This may permit computing devices 104 that do not have location sensors to adapt their behavior to the user's current location.

In some examples, the context-driven multi-user system provides services related to management of power consumption in a data center. The users include human operators of the data center, data center customers (e.g., colocation customers), and automated agents or other software or hardware systems that provide update records indicating power consumption, temperature, uptime, or other status information regarding components of the data center, or that receive propagation records or other commands to control components of the data center such as air-conditioning systems or circuit breakers. In some examples, datacenters may have redundant servers on different power circuits throughout the facility. Context data 118 may include a time history of power consumption and breaker trips. Analytics framework 204 may analyze the time history, e.g., using a neural network, to determine patterns of power consumption that are likely to lead to breaker trips. Analytics framework 204 may then modify the trigger conditions of one or more observer unit(s) 202 to respond to the determined patterns. When triggered, those observer unit(s) 202 may modify context data 118 to indicate to automated-agent users that relevant sections of the datacenter should be powered down to shed load, and the network traffic transferred to backup machines on other circuits. This may increase uptime of individual machines and of the datacenter as a whole, and reduce the probability of unexpected service interruptions.

In some examples, the context-driven multi-user system is a system facilitating real-time interaction between users and exchange of profile information between users. The profile information may be stored in context data 118. Examples of such systems include multiplayer online gaming systems, which may support hundreds or thousands of users interacting in real time. Restricting propagation records to the subsets of context data 118 specific to each computing device 104 in such systems may significantly reduce bandwidth consumption and latency. In some examples, users of such systems may designate other users as "friends." Profile information for Alice's friends may be replicated to Alice's local context data 132 so that she has low-latency access to her friends' status information, e.g., which game each friend is currently playing. In some examples, each user's computing device 104 may update context data 118 to include current ping times, dropped-packet counts, or other information useful to the online gaming system in selecting network connections for transfer of real-time gaming information between users playing a given game.

FIG. 3 shows a graphical representation of an example customer-support user interface, e.g., a Web page 300, e.g., as discussed with reference to FIG. 2 in the context of the customer-support example. Web page 300 is an example interface provided by the context-driven multiuser system to present each customer with information and options that reflect the context data 118 relevant to that particular customer, as discussed in various examples below. Web page 300 has two main sections: online-services section 302 and technician-call section 304. Online-services section includes buttons selectable, e.g., by a user, to perform virus removal (button 306) or a PC tune-up (button 308). Technician-call section 304 includes buttons 310(1)-310(4) selectable to establish communications, e.g., by online chat, SKYPE, or phone, with respective support technicians. Each button 306, 308, 310(1)-310(4) may include or be associated with additional information, e.g., to help the user decide which form of support the user desires. In the illustrated example, each button 310(1)-310(4) includes some components, labeled only on button 310(1) for clarity. These components include a picture 312 of the technician, the technician's name 314, the technician's rating 316 over previous calls, and the technician's primary language 318 (represented graphically by the flag of a country in which that language is spoken). All of these components may be included in context data 118.

Still referring to FIG. 3, and also referring to FIG. 2, continuing the customer-support example, when the user requests Web page 300, observer unit 202 may determine how the requested support Web page 300 should be presented based on the information from context data 118 about user preferences or background. For example, the user, or other users in the same demographic as the user making the request, may tend to prefer to talk to a technician than to use automated services. Accordingly, observer unit 202 may determine that section 304 should be presented above section 302 on Web page 300. Since users generally start viewing a Web page at the top of the page, positioning the user's preferred choice closer to the top may reduce the amount of time the user spends reading the page before finding the preferred choice. This positioning may reduce user workload and make user interactions with Web page 300 more efficient. This positioning may also reduce network bandwidth consumed by exploratory selections by the user. For example, instead of selecting virus removal button 306, deciding not to proceed, and then selecting a technician button 310(1)-310(4), the user may select the technician button 310(1)-310(4) first. Making the determination of arrangement of Web page 300 using observer unit 202 permits determining placement based on information in context data 118 about other users, which may improve efficiency of user interactions with Web page 300 even if the user has not specifically indicated a preference relating to page arrangement.

In some examples, observer unit 202 may customize the content of Web page 300 as well as the layout. For example, if context data 118 indicate the requesting user speaks only Japanese or that the requesting user's IP address is in ranges from which other users commonly select Japanese-speaking technicians, observer unit 202 may direct that technician button 310(3) (Japanese-speaker Matsuko Y.) be presented and that technician buttons 310(1), 310(2), and 310(4) be hidden or otherwise not presented on Web page 300, or presented in a less visible manner (e.g., smaller or dimmer) than technician button 310(3).

The layout of Web page 300 may also or alternatively be determined by interaction framework 134 of computing device 104(1). In some examples, Web page 300 includes code, e.g., in JAVASCRIPT, VBSCRIPT, or another scripting language, executable by interaction framework 134 to retrieve data from local context data 132 and adjust Web page 300. When the user requests Web page 300, the code and an initial layout is returned immediately to decrease the initial page load time. Interaction framework 134 may then execute at least some of the received code to display elements of Web page 300 using data already stored in local context 132, e.g., via previously-received propagation records.

When the page is loaded, interaction framework 134 may send an update record, e.g., a "context change" record, indicating the user is now viewing Web page 300. This update record may trigger an observer unit 202, which may respond by causing data needed by Web page 300 to be replicated from context data 118 into local context 132. Once the data are present in local context 132, interaction framework 134 may execute further code of Web page 300 to update Web page 300 based on the new data. Using a "two-stage" approach with an initial load followed by a context-driven update may permit more rapid display of initial choices, increasing user efficiency. Using a two-stage approach may also permit using Web Sockets connections (newly or previously established) to transfer data, which may be faster than opening a new HTTP connection and transferring the data by HTTP. Moreover, using a two-stage approach permits computing device 102(1) to replicate additional data to local context data 134 as needed to support user interactions. This may reduce bandwidth utilization, since only data that are needed may be transferred.

In some examples, Web page 300 may initially display online services section 302 but not display technician section 304. Observer unit 202 may select candidate technicians based on the user's reported problem, demographics, or other information in context data 118. Observer unit 202 may then add information of the candidate technicians to context data 118, from which the information may be replicated to local context data 134. Code of Web page 300 may then display section 304 with a technician button, e.g., button 310(1), for each candidate technician.

In some examples, in response to user selection of one of the technician buttons 310(1)-310(4), replication framework 120 modifies context data 118 to indicate which technician was selected. Replication framework 120 then sends a propagation record to computing device 104(2) of the selected technician. This sending may provide the selected technician more efficient access to information about the requesting user, improving efficiency of the technician's interactions with computing device 104(2). User interface 136 of computing device 104(2) may then present the selected technician with options or tools for assisting the user, e.g., a remote-login tool.

As the selected technician works with the requesting user, interaction framework 134 of computing device 104(2) may transmit update records to replication framework 120. Replication framework 120 may, in response to the update records, transmit propagation records to computing device 104(1) of the requesting user. Computing device 104(1) may then change its user interface 136 based at least in part on the modified local context data 132. Similarly, Computing device 104(1) may transmit update records, replication framework 120 provide propagation records to computing device 104(2), and computing device 104(2) change the form or content of its user interface 136. This bidirectional exchange of context modifications permits the requesting user, the support technician, and distributed computing resource 102 to maintain a consistent view of progress towards solving the user's problem. For example, computing device 104(2) may provide update records indicating each attempt to solve the problem. Replication framework 120 may log such indications into context data 118 but not provide corresponding propagation records to computing device 104(1) of the requesting user. This logging without corresponding propagation permits the company offering support, and the technician, to view the full history of, which may permit more effectively conducting follow-up calls or escalation of a particular problem. Moreover, logging without propagation to computing device 104(1) reduces the storage space of, and bandwidth consumed by or in communication with, computing device 104(1) without loss of functionality from the requesting user's point of view.

Logging without propagation may also permit streamlining interactions between users and the company providing support. In some examples, observer unit 202 may analyze the history of interactions with the requesting user and direct that Web page 300 be presented including or prominently displaying one(s) of buttons 310(1)-310(4) corresponding to technicians that are likely to be able to solve the user's problem. Such analysis and presentation may reduce the likelihood that escalation will be required to solve the problem, and thus may reduce the amount of network bandwidth consumed over the course of solving the problem.

In some examples, observer unit 202 may determine patterns of behavior consistent across multiple users and configure Web page 300 to respond accordingly. For example, if a user's history of behavior corresponds to behavior histories of other users who have expressed dissatisfaction, observer unit 202 may direct that access to a more experienced (e.g., second-tier) technician be presented through buttons 310(1)-310(4). This may reduce the time required to solve the user's problem or reduce network bandwidth consumed in finding the solution. This is an example of the business rule "escalate if a customer is sufficiently dissatisfied." Observer unit(s) 202 may each implement one or more business rules, or may cooperatively implement one or more business rules. In some of these examples, analytics framework 204 may determine the patterns of behavior or other aspects of selected business rules through analysis of context data 118 and provide corresponding triggering conditions to observer unit 202.

Figure 4:
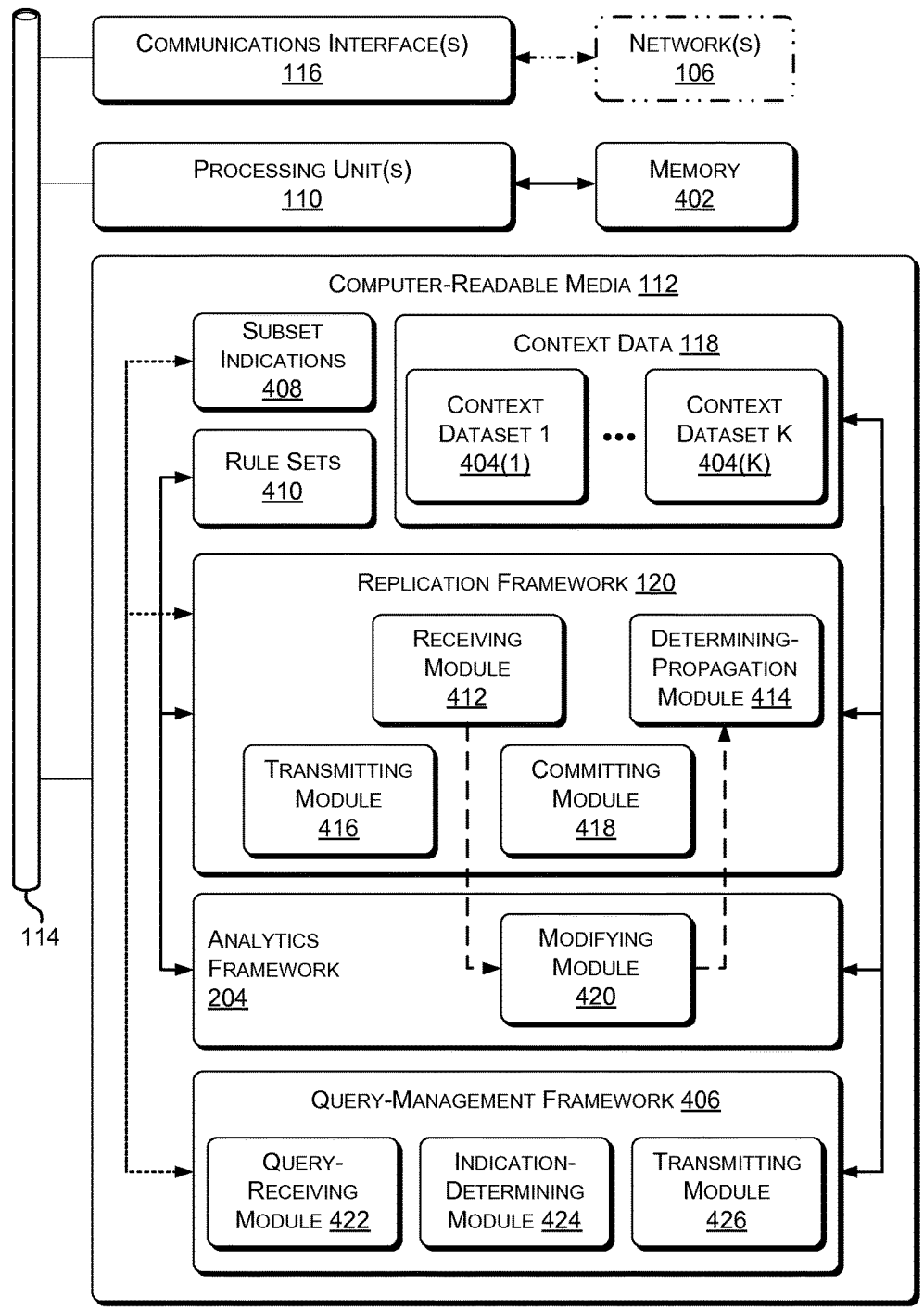
FIG. 4 is an illustrative diagram that shows example components of a distributed computing resource according to some examples described herein.

FIG. 4 is an illustrative diagram that shows example components of a distributed computing resource 102, e.g., a server of a multi-user system. Distributed computing resource 102 in the illustrated example includes processing unit(s) 110, which may be operatively coupled to memory 402, e.g., a cache memory. Distributed computing resource 102 also includes communications interface(s) 116 connected to network(s) 106 (shown in phantom). Processing unit(s) 110 are coupled via bus 114 to communications interface(s) 116 and to computer-readable media 112. Computer-readable media 112 in the illustrated example includes context data 118. In some examples, context data 118 may be context data of a multi-user system. Context data 118 may be related to interaction(s) of one or more user(s) with or via the multi-user system and may include respective data from each of a plurality of data sources, e.g., sensors 512 (FIG. 5) of electronic devices 104.

In some examples, computer-readable media 112 may store context data 118 in data storage, structured or unstructured, such as a database or data warehouse. In some examples, computer-readable media 112 may include a corpus or a relational database with one or more tables, arrays, indices, stored procedures, and so forth to enable data access including one or more of hypertext markup language (HTML) tables, JavaScript Object Notation (JSON) records, resource description framework (RDF) tables, web ontology language (OWL) tables, or extensible markup language (XML) tables, for example. Table formats consistent with industry standards such as HTML, XML, and JAVASCRIPT may be used.

In the illustrated example, context data 118 includes one or more context datasets 404(1)-404(K), where K is any integer greater than or equal to 1. Each context dataset 404 may store a different type of data, or data about different objects or people. Replication framework 120 may provide data from one or more of the context dataset(s) 404 as part of any given propagation record, as discussed below with reference to determining-propagation module 414. In an example, context dataset 404(1) holds support data for a population of users, and context dataset 404(K) holds sales data about a population of users. In another example, context dataset 404(1) holds context data relevant to user interactions with smartphones, e.g., custom spelling-words dictionaries and contacts, and context dataset 404(K) holds context data relevant to user interactions with a multiplayer gaming system. Any given user may be represented by data in one or more context datasets 404.

Distributed computing resource 102 may be configured to communicate with one or more first computing device(s) 104 with respect to a first context dataset 404(1), and with one or more second computing device(s) 104 with respect to a second context dataset 404(K). Any given computing device 104 may be included in the one or more first computing device(s), the one or more second computing device(s), or both. This arrangement permits distributed computing resource 102 to effectively provide relevant context data to computing devices 104 while maintaining individual context datasets 404 at a reasonable size and reducing the processor time required to process modifications to any individual context dataset 404. In some examples, distributed computing resource 102 may push updates for each context dataset 404 to those of the connected computing device(s) 104 that are replicating that context dataset 404. In some examples, distributed computing resource 102 may access data for the context datasets 404 from a plurality of storage devices, e.g., database servers 102(2). Each computing device 104 may receive updates to the relevant context dataset(s) 404 from distributed computing resource 102 regardless of which database server 102(2) stores any particular item of data.

In some examples, computer-readable media 112 may store computer program instructions, logic, or other instructions. Stored instructions may correspond to applications or to processes described herein. In some examples, computer-readable media 112 stores instructions of replication framework 120, observer unit(s) 202, analytics framework 204, a query-management framework 406 (discussed below), or other software executable by processing unit(s) 110. Computer-readable media 112 may store data for the operations of processes, applications, components, or modules stored in computer-readable media 112 or executed by processing unit(s) 110. In some examples, computer-readable media 112 may store subset indications 408 used by query-management framework 406 or rule sets 410 used by analytics framework 204. Each subset indication 408 may identify a respective proper subset of the context data and correspond to a respective replication client of the multi-user system.

The modules of the replication framework 120 stored on computer-readable media 112 may include one or more modules or APIs, which are illustrated as receiving module 412, determining-propagation module 414, and transmitting module 416. In some examples, the replication framework 120 may include a committing module 418. In some examples, the modules of the replication framework 120 are used together with module(s) of analytics framework 204, discussed in more detail below.

In the replication framework 120, the number of modules may vary higher or lower, and modules of some types may be used in some combinations. For example, functionality described associated with the illustrated modules may be combined to be performed by a fewer number of modules or APIs or may be split and performed by a larger number of modules or APIs.

In some examples, the modules of the replication framework 120 may include receiving module 412 configured to receive an update record corresponding to stored context data 118. As described above with reference to FIG. 2, the update record may correspond to an update request from observer unit(s) 202 or analytics framework 204, or an update due to data exchange via communications interface(s) 116. The update record may be received directly via communications interface 116 and network 106. The update record may include, e.g., a SQL INSERT, UPDATE, DELETE, or MERGE query, another query specification, or an HTTP POST, PUT, or DELETE request. The update record may also or alternatively be received from observer unit(s) 202 or analytics framework 204. In some examples, receiving module 412 may be configured to receive multiple update records corresponding to respective, different context datasets 404(1)-404(K).

In some examples, the modules of the replication framework 120 may include determining-propagation module 414 configured to determine a plurality of (or at least one) propagation records based at least in part on the received update record. Each of the propagation records may correspond to a respective, different proper subset (i.e., less than all) of stored context data 118. This may permit reducing bandwidth required for processing modifications to various subsets, increasing speed and performance of the multi-user system.

In the customer-support example, when the user's computing device 104(1) provides an update record with information regarding the user's reported problem, determining-propagation module 414 may determine a propagation record intended for the user's computing device 104(1) that indicates the problem has been successfully reported, and a separate propagation record intended for the technician's computing device 104(2) indicating the nature of the problem. In some examples, observer unit(s) 202 may process the received update record, and determining-propagation module 414 may include results of such processing in the propagation records. Continuing the customer-support example, an observer unit 202 may process the reported user problem indicated in the received update record and determine a possible solution. Determining-propagation module 414 may then include an indication of the determined possible solution in the propagation record intended for the user's computing device 104(1).

In some examples, receiving module 412 may receive multiple update records, as discussed above. In some of these examples, determining-propagation module 414 may determine a plurality of propagation records, e.g., corresponding to respective, different context datasets 404(1)-404(K).

In examples cooperating with analytics framework 204, modifying module 420 of analytics framework 204 may determine the propagation records based at least in part on the received update record and the context data 118. Examples are discussed below with reference to modifying module 420.

In some examples cooperating with analytics framework 204, modifying module 420 may determine the propagation records further based at least in part on a rule set 410 (or more than one rule set 410). The rule set may represent business rules, as discussed above. This is discussed below with reference to modifying module 420.

In some examples, the modules of the replication framework 120 may include transmitting module 416 configured to transmit the plurality of propagation records via one or more communications interfaces 116. In some examples, transmitting module 416 may transmit one or more propagation record(s) to one or more replication client(s), e.g., computing devices 104 having propagation-receiving module(s) 516, discussed below. Transmitting module 416 may transmit the propagation records using MICROSOFT Rx or similar technologies running over communications channels such as TCP or the high-level Web-service channels provided by the SIGNALR library (e.g., Web Sockets or Comet, also known as Reverse Ajax). In some examples, transmitting module 416 may transmit respective identifying information with each of the plurality of propagation records, e.g., IP addresses of corresponding computing devices 104.

In some examples, determining-propagation module 414 may determine multiple propagation records, as discussed above. In some of these examples, transmitting module 416 may transmit each of the plurality of propagation records, e.g., corresponding to respective, different context datasets 404(1)-404(K), e.g., to a respective computing device 104.

In some examples, the modules of the replication framework 120 may include committing module 418 configured to modify the stored context data 118 based at least in part on the received update record. Committing module 418 may, e.g., execute a provided SQL query against context data 118, apply a provided XSL stylesheet to the results of a provided XPath query and store the results, or otherwise modify table(s) or other contents, or the structure, of context data 118.

In some examples, distributed computing resource(s) 102 may implement analytics framework 204. Analytics framework 204 may implement machine learning, e.g., to modify business rules as described above. In some examples, accordingly, the modules of analytics framework 204 stored on computer-readable media 112 may include one or more modules or APIs, in the illustrated example modifying module 420. In some examples, analytics framework 204 may interoperate with receiving module 412 and determining-propagation module 414 of replication framework 120.

In analytics framework 204, additional modules may be included, and modules of some types may be used in some combinations. For example, functionality described associated with the illustrated modifying module 420 may be split and performed by a larger number of modules or APIs.

As discussed above, in some examples, determining-propagation module 414 uses rule set(s) 410 in determining the propagation records. The rule set may include, e.g., expressions of business rules in database-query languages such as SQL, or other computer-executable instructions. In some examples, determining-propagation module 414 may be configured to determine the one or more propagation records at least in part by applying the rule set to the update record and the context data to identify patterns in the context data indicative of actionable events. Each of the propagation records may correspond to a respective, different proper subset of the stored context data 118. This may permit detecting patterns that predict likely events and then feeding back results to update context data 118 to make better predictions in the future.

In some examples, the modules of analytics framework 204 may include modifying module 420 configured to modify the rule set based at least in part on the context data 118. Modifying module 420 may modify the rule set periodically, intermittently, when triggered by an event, or at other selected times. In some examples, modifying module 420 includes or communicates with a neural network that provides modifications to the rule set. The rule set may be stored in context data 118 or separately therefrom. In some examples, observer units 202 may receive notification of modifications to the rule set. The trigger conditions of observer units 202 may then be modified based at least in part on the modifications to the rule set.

In some examples, modifying module 420 is configured to apply at least some of the context data 118 to a neural network (not shown), e.g., a pre-trained deep neural network. Neural network coefficients or formulas may be stored on computer-readable media 112. Modifying module 420 in at least some of these examples may be configured to modify the rule set based at least in part on an output of the neural network.

In some of these examples, context data 118 includes training data for the neural network as well as test data to be analyzed by the neural network. Continuing the customer-support example, the training data may include stored data of user-reported problems and the solutions that fixed those problems. Analytics framework 204 may train the neural network, e.g., online as new solutions are found or in batch based on a snapshot of context data 118. The neural network training inputs may be the data of problems and the training outputs may be the solutions. In this way, the neural network will learn, as training progress, typical solutions for different user-reported problems. When a new user problem is reported, an observer unit 202 may provide the user-reported problems to the neural network and provide replication framework 120 an update record with the resulting suggested solution from the neural network.

Using module(s) of analytics framework 204 in cooperation with modules(s) of replication framework 120, trigger conditions and sets of local context data 132 may be modified over time to more effectively process incoming data. Continuing the customer-support example, multiple support technicians are frequently available. Each technician's computing device 104 holds respective local context data 132. The rule set may specify which information about a user is replicated to which computing devices 104. If a particular technician has a higher success rate solving problems with a particular software package than do other technicians, modifying module 420 may modify the rule set so that technician's computing device 104 receives more complete information about users having problems with that software package than do other technicians' computing devices 104. Modifying module 420 may further modify the rule set so that observer units 202 have specialized trigger conditions for problems with that software package. This may be done so that when a user reports a problem with that software package, the technician with the relatively higher success rate will be assigned or suggested to work with the user. Assigning technicians to problems they are likely to be able to solve may reduce the time and bandwidth required for users and technicians to interact to solve the user's problem.

In some examples, analytics framework 204 may process context data 118 of large numbers of users to detect typical patterns of problems and solutions. For example, interaction framework 134 of users' computing devices 104 may provide information about libraries, system components, and other software installed on computing devices 104. Analytics framework 204, e.g., using analytics framework 204, may identify correlations between particular reported user problems (as recorded in context data 118 in response to update records from computing devices 104) and particular installed software packages or versions of those software packages, as well as correlations between the absence of specific software packages or versions and the absence of those particular problems. Context data 118 or trigger conditions for one or more observer unit(s) 202 may then be modified to reflect identified correlations. When a user problem is reported and the user's computing device 104 includes software or versions corresponding to an identified correlation, an observer unit 202 may be triggered and may provide information to the user or the support technician suggesting removal or updating of specific software packages or versions that are: present on the user's computing device 104, correlated by their presence with the reported problem, and correlated by their absence with absence of the reported problem. This may permit solving the user's problem with reduced or no interaction with a support technician, reducing the bandwidth required to communicate information between computing devices 104(1) and 104(2).

In some examples, support technicians work with users via scripts listing common problems, solutions, and troubleshooting tasks. Scripts may be particularly helpful for newly-hired or less-experienced support technicians. The scripts may be presented to a support technician via computing device 104(2). In combination with the identification of correlations described above, or separately, analytics framework 204 may analyze context data 118 indicating the effectiveness of some steps of the scripts at solving user problems. Analytics framework 204 may then modify trigger conditions or context data 118 to modify the scripts. For example, script steps that more frequently succeed may be placed earlier in a script, or script steps that less frequently succeed may be placed later in a script, removed from the script, or moved to a different script (e.g., a tier-2 script).

As discussed above, distributed computing resources 102 may implement query management, e.g., to arrange for queries to be performed at network nodes where required data are available. In some examples, accordingly, the modules of query-management framework 406 stored on computer-readable media 112 may include one or more modules or APIs, which are illustrated as query-receiving module 422, determining module 424, and transmitting module 426. Query-management framework 406 may also include modules (not shown) for receiving and storing subset indications 408. For example, determining-propagation module 414 of replication framework 120 may determine subset indications 408 corresponding to the determined propagation records and store the determined subset indications 408 in computer-readable media 112 or provide the determined subset indications 408 to query-management framework 406, which may then store the determined subset indications 408 in computer-readable media 112. In some examples, propagation records may also be determined based on respective ones of the subset indications 408. The rule set may additionally or alternatively represent which computing device(s) 104 should receive which subsets of context data 118.

In query-management framework 406, the number of modules may vary higher or lower, and modules of some types may be used in some combinations. For example, functionality described associated with the illustrated modules may be combined to be performed by a fewer number of modules or APIs or may be split and performed by a larger number of modules or APIs.

In some examples, the modules of query-management framework 406 may include query-receiving module 422 configured to receive a query specification. The query specification may be received via communications interface(s) 116 or a user interface (not shown) of distributed computing resource 102, e.g., an administration graphical user interface. The query specification may include a source-code or compiled query in a database query language, e.g., MICROSOFT Rx, LINQ, XPATH, or SQL. The query specification may reference one or more of the data sources.

In some examples, the modules of query-management framework 406 may include determining module 424 configured to select one of the subset indications 408 based at least in part on the received query specification. Each of the subset indications may identify a respective proper subset (i.e., less than all) of the context data 118. Each of the subset indications may further include an indication of a computing device 104 storing the respective proper subset of the context data 118 in local context data 132 of computing device 104. Determining module 424 may additionally or alternatively select one of the subset indications 408 based at least in part on context data 118. Examples of selection are discussed below.

In some examples, the modules of query-management framework 406 may include transmitting module 426 configured to transmit the received query specification and identifying information of the selected subset indication 408 via the communications interface. The identifying information may include a unique ID number, e.g., a database primary key, a stored-procedure name, a destination IP address, a copy of subset indication 408, or other information identifying subset indication 408. In some examples, transmitting module 426 may transmit the received query specification via the communications interface 116 to a replication client of the multi-user system corresponding to the selected one of the subset indications. This may reduce the latency of query execution by reducing the volume of data transferred between replication clients and servers while executing a query.

In some examples, a distributed computing resource 102 or computing device 104 holding the selected subset indication may receive the query specification and execute the query. That computing device 104 may then provide results to the distributed computing resource 102, an alternative destination specified in the query specification, or another distributed computing resource 102 or computing device 104. Transmitting query specifications to network nodes equipped to handle them permits reducing network bandwidth usage that might otherwise be allocated for transferring data between network nodes. Such transmission may also increase query speed by permitting queries to be executed using disk or memory data transfer rates to move data in and out of a processing unit 124 executing the query in place of network data transfer rates, which are typically slower. In some examples, the query specification includes an object instance implementing a MICROSOFT Rx IQbservable or IQbservable(TSource) interface.

Transmitting query specifications to network nodes equipped to handle them may also permit nodes to receive query results even if they are restricted from accessing the data required to run the query. In an example, the query specification may rely on location data of user Alice's smartphone (a computing device 104). Bob may desire to use his computing device 104 to determine whether Alice is at work. However, Alice may have opted out of sharing her coordinates or other fine-grained location data with Bob, e.g., for privacy reasons. In this case, a distributed computing resource 102 may receive a query specification from Bob asking whether Alice's location is within known coordinates of Alice's office building. The distributed computing resource 102 may transmit that query specification to Alice's smartphone. Alice's smartphone may execute the received query specification and provide the distributed computing resource 102 a yes-or-no indication of whether Alice is in the office, e.g., as an update record. The distributed computing resource 102 may then provide a propagation record including that indication to Bob's computing device 104, which may update Bob's local context data 132 with the result of the query. Accordingly, in this example, transmitting Bob's query specification to Alice's smartphone permits Bob to determine, by inspecting his local context data 132, whether Alice is in the office, without trespassing Alice's privacy restrictions on the use of her coordinate data.

In some examples, Alice's smartphone transmits update records when Alice's coordinates change. Observer unit(s) 202 implementing stream-processing or dataflow-processing functions (e.g., MICROSOFT Rx, Elm, or LABVIEW) may trigger calculations in response to such update records. The triggered calculations may include providing a query specification to distributed computing resource 102 to determine whether Alice is in the office, which query specification may be processed on Alice's smartphone as described above. The triggered calculations may also include providing the result of the determination to Bob's local context data 132. In some examples, Alice's smartphone may determine whether Alice is in the office or compute other data, e.g., aggregate location data. Alice's smartphone may send update records on a selected schedule or at selected intervals so that Bob has current information about Alice's location with reduced bandwidth consumption compared to transmitting the location data used to determine whether Alice is in the office.

In some examples, query-management framework 406 interoperates with replication framework 120. In some of these examples, transmitting module 416 of replication framework 120 may transmit each of the determined propagation records with identifying information of the respective subset indication. The identifying information may be transmitted in association with the propagation records, e.g., in the same network packet or in a different network packet of the same connection. In some examples, the identifying information is conveyed by packets that establish a connection over which the subset indication is transmitted. This transmission permits recipients of queries or propagation records to readily correlate queries with propagation records. This may reduce the processing required to handle queries when, e.g., a given computing device 104 holds more than one local context subset 514, as discussed below with reference to FIG. 5.

In some examples, determining module 424 is configured to determine a subset indication relating to the input values requested by the query specification. For example, if the query specification requires input values from selected columns of each of a plurality of database tables, determining module 424 may determine which subset indication 408 includes, e.g., the highest number of those tables, the highest number of the referenced columns, or the highest percentage of an expected amount of data to be processed. Determining module 424 may then select the determined subset indication 408 to receive the query specification. Such selection permits reducing the volume of data to be transferred between network nodes to perform the query.

In some examples, determining module 424 is configured to select a subset indication 408 corresponding to a source of at least some of the input values required by the query specification. Continuing the customer-support example, if the query specification uses, as an input, data of attempts to solve the user's problem, determining module 424 may determine a subset indication 408 corresponding to the support technician's computing device 104(2). Such determining may reduce the latency in executing the query specification, since the query specification may be executed on the support technician's computing device 104(2) once the support technician has chosen a particular attempt and before data of that attempt has been replicated from local context data 132 of the support technician's computing device 104(2) to context data 118.

Figure 5:
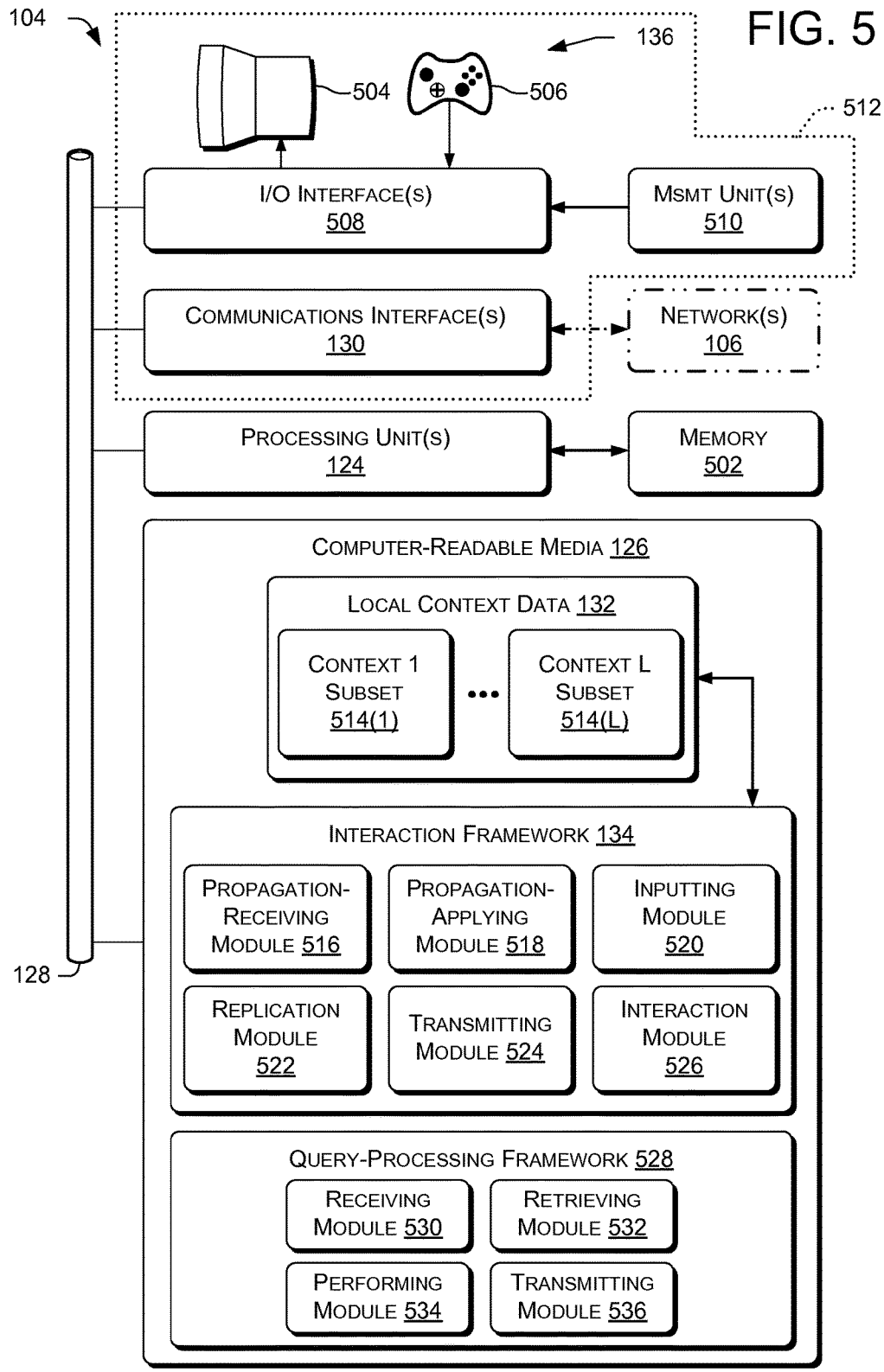
FIG. 5 is an illustrative diagram that shows example components of a computing device according to some examples described herein.

FIG. 5 is an illustrative diagram that shows example components of a computing device 104, e.g., a replication client of a multi-user system. Computing device 104 in the illustrated example includes processing unit(s) 124, which may be operatively coupled to memory 502, e.g., a cache memory. Computing device 104 also includes communications interface(s) 130 connected to network(s) 106 (shown in phantom). Processing unit(s) 124 are coupled via bus 128 to communications interface(s) 130 and to computer-readable media 126. Computer-readable media 126 in the illustrated example includes local context data 132 and computer program instructions, logic, or other instructions of interaction framework 134.

Computing device 104 may include or be connected to a user interface 136. User interface 136 may include a display 504. Display 504 may include an organic light-emitting-diode (OLED) display, a liquid-crystal display (LCD), a cathode-ray tube (CRT), or another type of visual display. Display 504 may be a component of a touchscreen, or may include a touchscreen. User interface 136 may include some types of output devices described above with reference to user interface 136. Processing unit(s) 124 may be operably coupled to user interface 136.

User interface 136 may include a user-operable input device 506 (graphically represented as a gamepad). User-operable input device 506 may include some types of input devices described above with reference to user interface 136.

Computing device 104 may further include one or more input/output (I/O) interface(s) 508 to permit computing device 104 to communicate with input, output, or I/O devices (for clarity, some not depicted). Examples of such devices may include components of user interface 136 such as user-operable input devices and output devices described above with reference to user interface 136. Computing device 104 may communicate via I/O interface 508 with suitable devices or using suitable electronic/software interaction methods. Input data, e.g., of user inputs on user-operable input device 506, may be received via I/O interface(s) 508, and output data, e.g., of user interface screens, may be provided via I/O interface(s) 508 to display 504, e.g., for viewing by a user.

In some examples, computing device 104 may include one or more measurement unit(s) 510. Measurement units 510 may detect physical properties or status of computing device 104 or its environment. Measurement units 510 may be examples of sensors, as discussed below. Components of user interface 136 may also be examples of sensors, as discussed below.

Examples of measurement units 510 may include units to detect motion, temperature, pressure, light, sound, electromagnetic radiation (e.g., for wireless networking), or any other detectable form of energy or matter in or within sensing range of computing device 104. In some examples of a smartphone computing device 104, measurement units 510 may include an accelerometer, a microphone, front- and rear-facing cameras, and transceivers for BLUETOOTH, WI-FI, and LTE. Examples of measurement units 510 may include devices for measuring physical properties, devices for communicating, or devices for receiving information. In some examples, measurement units 510 may include a network transceiver (e.g., communications interface 130), a motion sensor, a proximity detector (e.g., for nearby life forms, people, or devices), a light sensor (e.g., a CdS photoresistor or a phototransistor), a still imager (e.g., CCD or CMOS), a video imager (e.g., CCD or CMOS), a microphone, a fingerprint reader, a retinal scanner, or a touchscreen (e.g., in or associated with display 504 in user interface 136).

Computing device 104 may include one or more sensors 512, which may represent measurement units 510 or components of user interface 136. In some examples, user interface 136 may include at least one of the sensors 512. For example, the user interface 136 may include a touchscreen that is a sensor 512. Processing units 124 may be operably coupled to sensors 512. Sensors 512 may provide data records to processing unit(s) 124.

In some examples, computer-readable media 126 may store local context data 132 in data storage, structured or unstructured, such as a database or data warehouse. In some examples, computer-readable media 126 may include a corpus or a relational database with one or more tables, arrays, indices, stored procedures, and so forth to enable data access including one or more of hypertext markup language (HTML) tables, JavaScript Object Notation (JSON) records, resource description framework (RDF) tables, web ontology language (OWL) tables, or extensible markup language (XML) tables, for example. Table formats consistent with industry standards such as HTML, XML, and JAVASCRIPT may be used.

In the illustrated example, local context data 132 includes local context subsets 514(1)-514(L) of one or more contexts 1-L, where L is any integer greater than or equal to 1. Each local context subset 514 may correspond to a respective context dataset 404, FIG. 4. Storing multiple local context subsets 514 permits interaction framework 134 to more efficiently process local context data 132 relevant to a particular data record. Interaction framework 134 may determine which local context subset 514 any given data record corresponds to with a small amount of processing, then process records only in that local context subset 514 to take further action. Storing multiple local context subsets 514 may also reduce the amount of network bandwidth used in modifying local context data 132, since each modification may only affect (and thus may only include data for) part of local context data 132.

Computer-readable media 126 may store data for the operations of processes, applications, components, or modules stored in computer-readable media 126 or executed by processing unit(s) 124. In some examples, the data store may store computer program instructions, e.g., instructions corresponding to applications, to smartphone apps, to processes described herein, to interaction framework 134, or to other software executable by processing unit(s) 124.

The modules of interaction framework 134 stored on computer-readable media 126 may include one or more modules, e.g., shell modules, or application programming interface (API) modules) which are illustrated as a propagation-receiving module 516, a propagation-applying module 518, an inputting module 520, a replication module 522, a transmitting module 524, and an interaction module 526.

In the interaction framework 134, the number of modules may vary higher or lower, and modules of some types may be used in some combinations. For example, functionality described associated with the illustrated modules may be combined to be performed by a fewer number of modules or APIs or may be split and performed by a larger number of modules or APIs.

In some examples, the modules of interaction framework 134 may include propagation-receiving module 516 configured to receive a propagation record via the communications interface, e.g., from a replication server. The propagation record may be received from a replication controller or other distributed computing resource 102. As discussed above, the propagation record may specify changes to be made to local context data 132. The propagation record may correspond to less than all of the context data 118 held by distributed computing resource(s) 102.

In some examples, the modules of interaction framework 134 may include propagation-applying module 518 configured to modify local context data 132 based at least in part on the received propagation record. By using propagation-receiving module 516 and propagation-applying module 518, local context data 132 may be kept synchronized with changes to context data 118 from distributed computing resource(s) 102 or other computing device(s) 104. The local context data may be related to interaction(s) of one or more user(s) with the multiuser system.

In some examples, propagation-receiving module 516 may be further configured to receiving a second propagation record via the communications interface, e.g., as discussed above with reference to the propagation record. In some of these examples, propagation-applying module 518 may be further configured to modify second local context data different from the local context data based at least in part on the received second propagation record. For example, local context subset 514(1) may be modified in response to the propagation record, and local context subset 514(L) may be modified in response to the second propagation record. The propagation record and the second propagation record may be received from a single distributed computing resource 102 or respective, different distributed computing resources 102.

In some examples, the modules of interaction framework 134 may include inputting module 520 configured to receive a first data record. The first data record may be received, e.g., from or via the user interface 136, a measurement unit 510, or another sensor 512. The first data record may be indicative of, e.g., user interaction with computing device 104 or the state or a state change of the environment around computing device 104.

In some examples, inputting module 520 is configured to detect multiple signals using the one or more sensor(s) 512, e.g., via the I/O interface 508 and the bus 128. Throughout this disclosure, computing device 104 may detect additional signals or sets of signals that are not processed by herein-described modules or do not undergo herein-described processing operations.

Detected signals may include position of computing device 104, e.g., as measured using GPS, triangulation from cell-phone towers or WI-FI access points, or other geolocation techniques. Detected signals may include speed, velocity, acceleration, or jerk of motion of computing device 104, or orientation of computing device 104, e.g., as measured by accelerometer(s) on or associated with computing device 104. Detected signals may include orientation of computing device 104 in a hand of a person, the size of the person's hand, or whether the person is gripping computing device 104 with a left hand or a right hand, determined, e.g., using grip sensor(s) or touchscreen(s). Detected signals may include audio data, e.g., of a nearby person's voice or speech. Audio data may be captured by a mouthpiece of a smartphone, or by another microphone of computing device 104. Detected signals may include video data of a person using computing device 104. Detected signals may include behavioral characteristics of a person using computing device 104, e.g., cadence of the person's typing on a keyboard or soft keyboard, or what style of input the user is primarily employing (e.g., per-letter touch vs. whole-word swipe on a touchscreen). Detected signals may include characteristics of the gait of a person carrying computing device 104, e.g., speed, frequency of footfalls, leg length (inferred from speed and footfalls), or whether the person is favoring one leg over the other. Detected signals may be determined using other detected signals (e.g., gait signals may be detected by processing accelerometer and GPS data).

In some examples, the modules of interaction framework 134 may include replication module 522 configured to determine an update record based at least in part on the first data record and local context data 132. Replication module 522 may apply filtering rules, business rules, or other logic to the first data record or local context data 132 to determine what changes should be made to context data 118. In some examples, context data 118 includes a copy of all data in local context data 132, and the update record includes new values of any items in local context data 132 that changed or will change in value in response to the received first data record.

In some examples, the modules of interaction framework 134 may include transmitting module 524 configured to transmit the determined update record via the communications interface. Transmitting module 524 may transmit the determined update record to distributed computing resource 102. By using inputting module 520, replication module 522, and transmitting module 524, context data 118 may be kept synchronized with changes to local context data 132. Distributed computing resource(s) 102 may replicate changes to context data 118 as described above so that local context data 132 of other computing devices may be kept synchronized with changes to the illustrated local context data 132. In some examples, transmitting module 524 may transmit the determined update record to the replication server via the communications interface 130 to update context data stored at the replication server.

In an example, user Alice may have a smartphone (computing device 104) including a measurement unit 510 configured to detect the smartphone's location, and thus, by implication, Alice's location. In some examples, Alice may opt in to allow her location information to be shared publicly or with only specified individuals (e.g., friends or contacts). Additionally, Alice may opt to share her coordinates or a more generalized description of her location (e.g., at home, at work, etc.). In some of these examples, Alice's location information, e.g., the coordinates or generalized description, may be stored in Alice's local context data 132. Alice's smartphone may provide update records (blocks 522, 524) to a distributed computing resource 102 when Alice changes location (in terms of coordinates, e.g., when Alice moves more than 10 m in any direction, or in terms of generalized description). Distributed computing resource 102 may modify context data 118 to include Alice's location information (blocks 412, 418). Distributed computing resource 102 may transmit update records including Alice's location information to computing device(s) 104 of users who have access to that information (blocks 414, 416).

In some examples, context data 118 may hold both coordinates and a generalized description of Alice's location. Distributed computing resource 102 may transmit propagation records including the coordinates to some computing devices, e.g., user Hector's, and propagation records including the generalized description but not the coordinates to other computing devices 104, e.g., user Bob's. Bob's computing device 104 may receive the propagation records (block 516) carrying the general description, e.g., in response to Alice's changing location, and modify Bob's local context data 132 accordingly (block 518). Bob may then determine Alice's generalized location by consulting his own local context data 132. Hector's computing device 104 may receive the propagation records (block 516) carrying the coordinates, and modify Hector's local context data 132 accordingly (block 518). Hector may then determine Alice's coordinates by consulting his own local context data 132.

In some examples, inputting module 520 may be further configured to receive a second data record, e.g., via user interface 136. In some of these examples, replication module 522 may be further configured to determine a second update record based at least in part on the second data record and second local context data different from the local context data. In some of these examples, transmitting module 524 may be further configured to transmit the determined second update record via communications interface 130. For example, local context subset 514(1) may be modified in response to the update record, and local context subset 514(L) may be modified in response to the second update record. The update record and the second update record may be transmitted to a single distributed computing resource 102 or respective, different distributed computing resources 102.

In some examples, the modules of interaction framework 134 may include interaction module 526. Interaction module 526 may be configured to receive an additional data record via user interface 136. Interaction module 526 may be further configured to modify local context data 132 based at least in part on the additional data record, and to provide an output based at least in part on the additional data record and the modified local context data 132. Interaction module 526 may provide the output via user interface 136. In some examples, interaction module 526 is configured to provide the output without or prior to communicating via the communications interface 130. This may reduce latency of user interface 136 in responding to user requests or actions. In response to modification of local context data 132, interaction framework 134 may provide update records as discussed above with reference to arrow 206, FIG. 2.

Using interaction module 526 permits local changes to be applied or shown more quickly, without the need to wait for a network round-trip. Processing on computing device 104 as carried out by interaction module 526 may reduce processing time and latency and thereby improve the responsiveness of the computing device 104 to the user.

In some examples, distributed computing resource 102 may reject or overwrite update records from computing device 104, e.g., by modifying context data 118 differently from the modification indicated in an update record. In some examples, interaction module 526 may modify local context data 132. Interaction framework 134 may then provide an update record. Replication framework 120 may receive the update record, process the update record (e.g., using observer units 202), and determine modifications to context data 118. Propagation records may then be transmitted to computing device 104. Local context data 132 may then be updated according to the propagation records. Accordingly, local context data 132 after applying the propagation record may differ from local context data 132 before transmitting the update record. This is referred to as "compensation." Changes to local context data 132 may be applied, then later a compensation context change may be applied to transition local context data 132 to a previous state or to another allowed state. Using compensation may provide reduced latency of user interactions with computing device 104 compared to delaying updates to local context data 132 until propagation records are received, as is common in conventional transactional database models such as the "ACID" model.

Some combinations of modules may be used in interaction framework 134. In some examples, interaction framework 134 includes propagation-receiving module 516 and propagation-applying module 518. In some examples, interaction framework 134 includes inputting module 520, replication module 522, and transmitting module 524. In some examples, interaction framework 134 includes interaction module 526. Other combinations of these may be used. For example, interaction framework 134 may include propagation-receiving module 516, propagation-applying module 518, and interaction module 526, or may include inputting module 520, replication module 522, transmitting module 524, and interaction module 526.

In some examples, computer-readable media 126 of computing device 104 may include instructions of query-processing framework 528. The stored instructions may be executable by processing unit(s) 124. Query-processing framework 528 may include receiving module 530, retrieving module 532, performing module 534, and transmitting module 536. The modules may be combined in various ways, similarly to ways discussed above with reference to modules of interaction framework 134. Computing device 104, which may be a replication client, may include a sensor 512, as discussed above.

In some examples, query-processing framework 528 may include receiving module 530 configured to receive, via the communications interface 130, a query specification including a database query referencing the sensor 512. The query specification may be received, e.g., from the server, e.g., a replication server or other distributed computing resource 102.

In some examples, query-processing framework 528 may include retrieving module 532 configured to retrieve data from the sensor 512. Retrieving module 532 may retrieve data directly from sensor 512 or from an area of memory 502 or computer-readable media 126 in which sensor 512 data are stored.

In some examples, query-processing framework 528 may include performing module 534 configured to perform the database query using the retrieved data. Performing module 534 may, for example, execute an SQL stored procedure or XPATH or other query.

In some examples, query-processing framework 528 may include transmitting module 536 configured to transmitting a result of the performed database query via the communications interface 130. Transmitting module 536 may transmit the result to a server, a replication server, a replication client, or another computing device 104 or distributed computing resource 102.

Illustrative Processes

Figure 6:
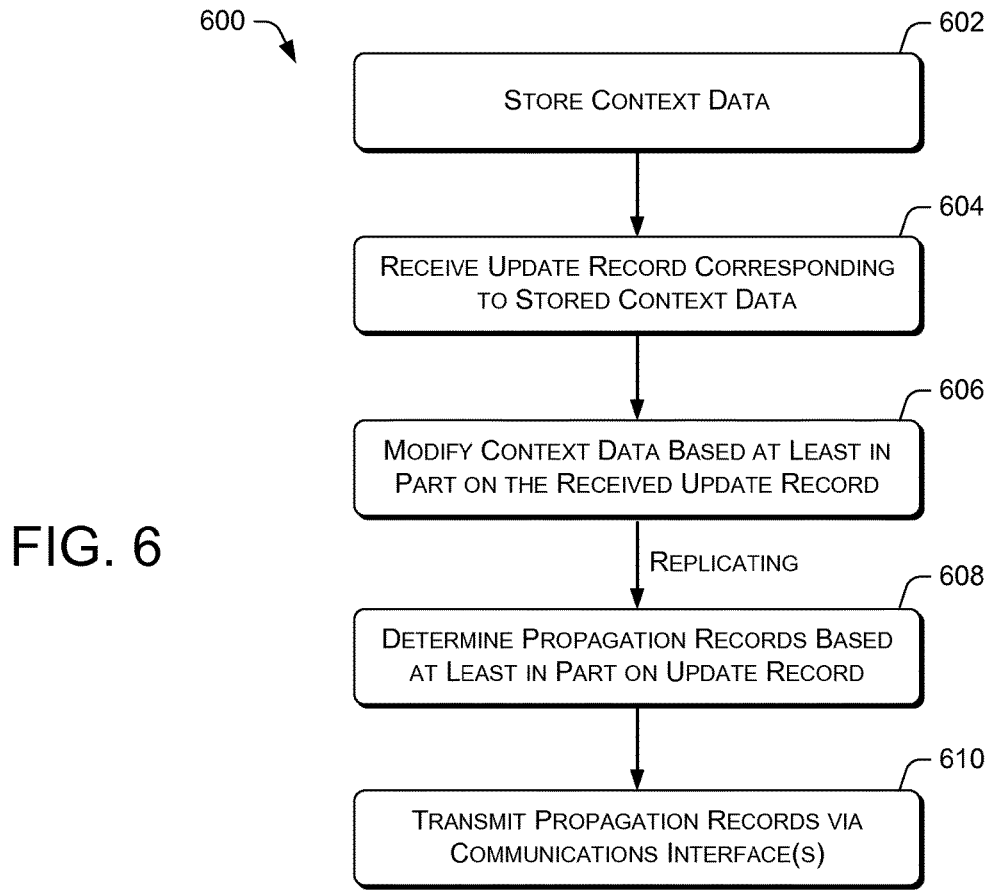
FIG. 6 is a flow diagram that illustrates an example process for propagating changes to context data according to some examples described herein.

FIG. 6 is a flow diagram that illustrates an example process 600 for propagating changes to context data 118 or for otherwise replicating data using a replication server, e.g., distributed computing resource 102, of a multi-user system. A "replication server" is not limited to server-class computers and may be implemented, e.g., using a laptop or tablet computer. Example functions shown in FIG. 6 and other flow diagrams and example processes herein may be implemented on or otherwise embodied in one or more distributed computing resource(s) 102 or computing device(s) 104. In some examples, example functions may be implemented using as software running on a distributed computing resource 102 or a computing device 104. For the sake of illustration, the example process 600 is described below with reference to processing unit 110 in distributed computing resource 102(1), FIG. 1. However, other processing unit(s) such as processing unit 124 and/or other components of distributed computing resource(s) 102 or computing device(s) 104 may carry out step(s) of described example processes such as process 600.

The order in which the operations are described in each example flow diagram or process is not intended to be construed as a limitation, and any number of the described operations may be combined in any order and/or in parallel to implement each process. Moreover, the operations in each of FIGS. 6-15 may be implemented in hardware, software, and a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions. The flow diagrams herein are described with respect to specifically-identified components shown in FIGS. 1-5 solely for clarity of explanation, and such specific identifications are not limiting.

At block 602, replication framework 120 may store context data 118 on the replication server. As discussed above, the context data may be related to interaction(s) of one or more user(s) with or via the multi-user system. Storing context data 118 may permit distributed computing resource 102 to serve as a middle-tier broker. Modifying the stored context data based on input from each replication client may permit the replication server to repackage the data to support "mashups," discussed below.

At block 604, replication framework 120 may receive an update record corresponding to less than all of the stored context data 118. This may be part of a receiving function of a middle-tier broker. The update record may be received from a first one of a plurality of replication clients of the multi-user system. Replication clients may include computing devices 104. In some examples, the receiving may include accepting data of the update record in response to a signal from the first one of the plurality of replication clients. The signal may include, e.g., an HTTP "pull" (client-initiated) transaction via a REST API. Example functions performed in block 604 are described above with reference to receiving module 412, FIG. 4. Block 604 may be followed by block 608 or block 606.

At block 606, stored context data 118 are modified based at least in part on the received update record. Example functions performed in block 606 are described above with reference to committing module 418, FIG. 4.

At block 608, replication framework 120 may, using the replication server (e.g., processing unit(s) 216), automatically determine a plurality of propagation records based at least in part on the received update record. This may be part of a transmitting function of a middle-tier broker. Each of the propagation records may correspond to a respective, different subset of stored context data 118, e.g., to local context data 132 of a respective computing device 104. Accordingly, bandwidth may be reduced by transmitting propagation records in block 610, below, rather than transmitting all the context data 118 to each replication client. Example functions performed in block 608 are described above with reference to determining-propagation module 414, FIG. 4.

At block 610, replication framework 120 may transmit the propagation records of the plurality of propagation records, e.g., to respective ones of the replication clients, via one or more communications interfaces 116. Example functions performed in block 610 are described above with reference to transmitting module 416, FIG. 4. For example, replication framework 120 may transmit respective identifying information with each of the plurality of propagation records. Replication framework 120 may transmit propagation record(s) to replication client(s) or other computing device(s) 104, as discussed above with reference to transmitting module 416. Replication client(s) may transmit messages to replication server(s) to subscribe to specific projections (proper subsets) of context data 118. In some examples, the transmitting may include transmitting respective notification signals to respective ones of the replication clients. This may correspond to a "push" (server-initiated) transfer, e.g., via a Web Sockets connection. Distributed computing resource 102 may communicate with observer units 202 and other back-end systems via, e.g., SOAP or other Web Services or RPC interfaces, and with replication clients via REST or other client-facing interfaces. This may permit distributed computing resource 102 to bridge the "impedance mismatch" between Web Services and REST interfaces.

Continuing the customer-support example, the update record may correspond to a request from a user for technical support. The stored context data may include first information regarding a configuration of a computing device of the user and second information identifying a support technician. The plurality of propagation records may include a first propagation record including the first information and omitting the second information; and a second propagation record including the second information and omitting the first information. The transmitting (block 610) may further includes transmitting the first propagation record to a replication client of the support technician and transmitting the second propagation record to a replication client of the user. Using propagation records corresponding to respective proper subsets may reduce bandwidth consumption since each participant only receives data relevant to that participant. Using such propagation records may also increase security of the system since each party is provided only information to which that party has access. The display of information to the user or the technician may be more efficient in these examples than in prior schemes since there is less information to display than the full contents of context data 118, and the information in each propagation record may be more likely to be pertinent to the user receiving the respective information.

In some examples, method 600 further includes receiving, from a second, different one of the plurality of replication clients, a second update record corresponding to less than all of the stored context data; using the replication server, automatically determining a plurality of second propagation records based at least in part on the received second update record, wherein each of the second propagation records corresponds to a respective, different proper subset of the stored context data; and transmitting the plurality of second propagation records via one or more communications interfaces, wherein at least one of the propagation records and at least one of the second propagation records are transmitted to a selected one of the plurality of replication clients. This permits performing "mashup" operations using distributed computing resource 102. In a mashup, the replication server aggregates or combines data from multiple sources and provides the aggregation or combination to a replication client.

Figure 7:
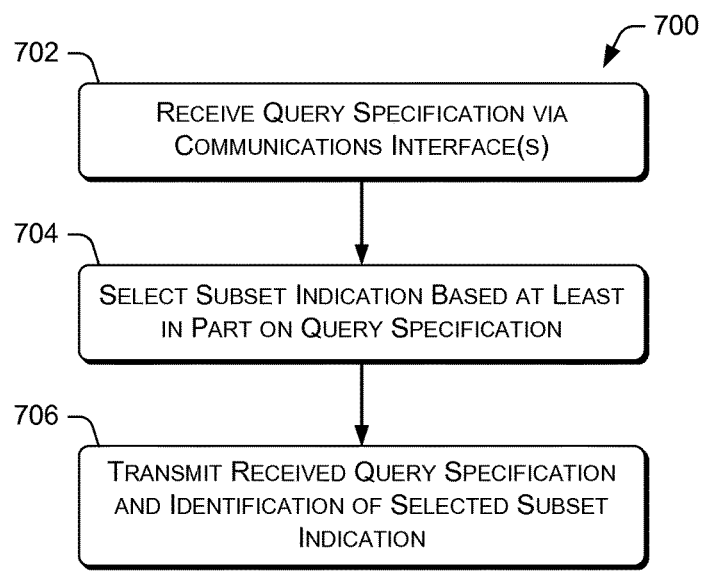
FIG. 7 is a flow diagram that illustrates an example process for managing queries in a distributed system according to some examples described herein.

FIG. 7 is a flow diagram that illustrates an example process 700 for managing queries in a distributed system, e.g., using distributed computing resource 102 running query-management framework 406.

At block 702, query-management framework 406 receives a query specification, e.g., a compiled query or other database query. Block 702 may include receiving the query specification via communications interface 116, e.g., from user interface 136 of computing device 104. Example functions performed in block 702 are described above with reference to query-receiving module 422, FIG. 4.

At block 704, query-management framework 406 selects one of the subset indications based at least in part on the received query specification. Example functions performed in block 608 are described above with reference to determining module 424, FIG. 4.

At block 706, query-management framework 406 transmits the received query specification and identifying information of the selected subset indication via the communications interface. Example functions performed in block 706 are described above with reference to transmitting module 426, FIG. 4.

Figure 8:
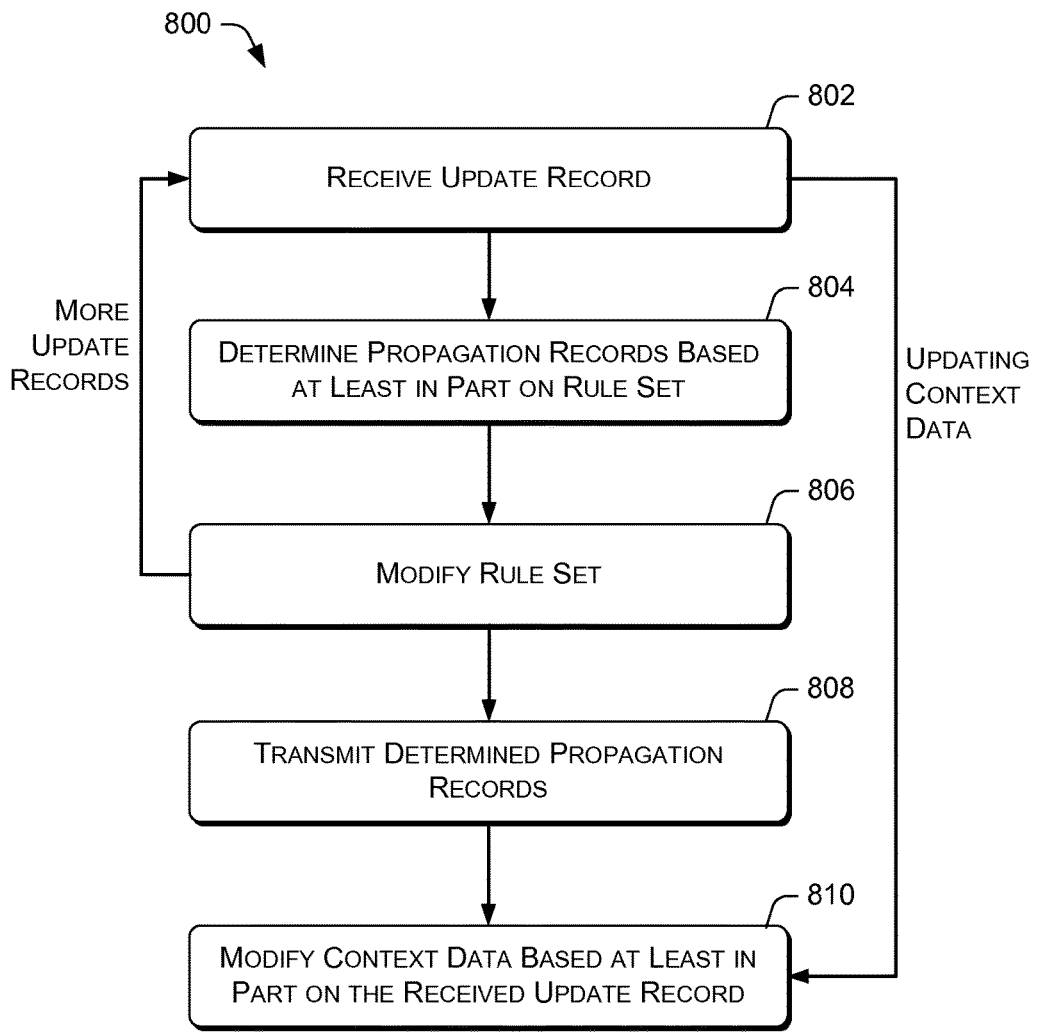
FIG. 8 is a flow diagram that illustrates an example process for managing propagation of context data in a distributed system according to some examples described herein.

FIG. 8 is a flow diagram that illustrates an example process 800 for managing propagation of context data 118 in a distributed system, e.g., using distributed computing resource 102 running analytics framework 204. In some examples, block 706, FIG. 7, is followed by block 802.

At block 802, analytics framework 204 receives an update record, e.g., an SQL or HTTP transaction, via communications interface 116. Example functions performed in block 702 are described above with reference to query-receiving module 422, FIG. 5. Block 802 may be followed by block 804 or by block 810.

At block 804, analytics framework 204 determines one or more propagation records based at least in part on the update record, the context data, a rule set, and respective ones of the subset indications. Example functions performed in block 804 are described above with reference to modifying module 420, FIG. 4.

At block 806, analytics framework 204 modifies the rule set based at least in part on the context data. Example functions performed in block 806 are described above with reference to modifying module 420, FIG. 4. Block 806 may be followed by block 802 or block 808. In this way, analytics framework 204 may repeatedly modify the rule set, e.g., as new update records are provided. Modification may be performed, e.g., periodically, intermittently, or on a selected schedule.

In some examples, at block 808, analytics framework 204 transmits each, or one or more, of the determined propagation records with (e.g., accompanied by) identifying information of the respective subset indication via communications interface 116. Example functions performed in block 808 are described above with reference to transmitting module 416, FIG. 4.

At block 810, analytics framework 204 modifies the context data based at least in part on the received update record. Example functions performed in block 810 are described above with reference to committing module 418, FIG. 4.

Figure 9:
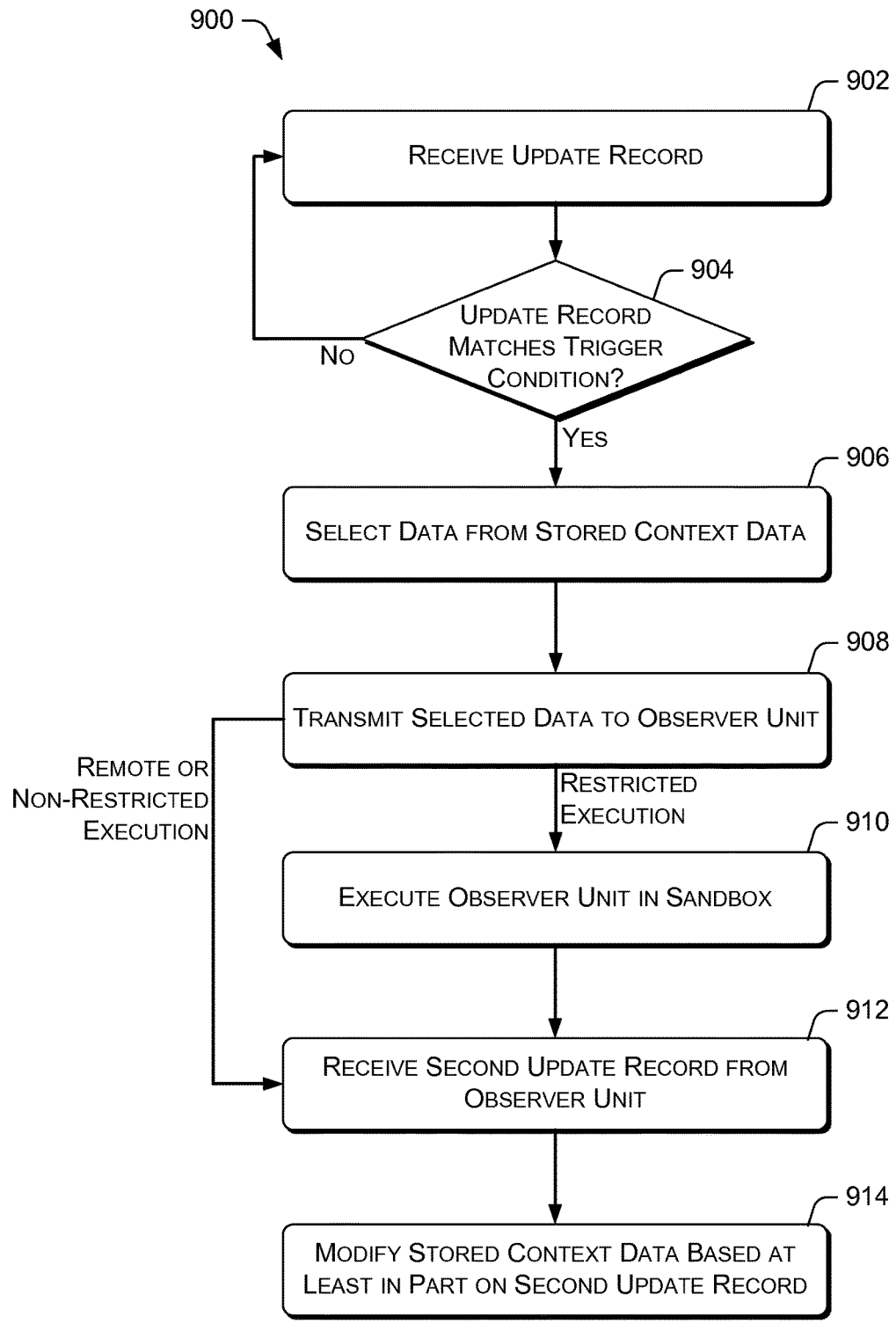
FIG. 9 is a flow diagram that illustrates an example process for managing context data in a distributed system according to some examples described herein.

FIG. 9 is a flow diagram that illustrates an example process 900 for managing context data 118 in a distributed system, e.g., using distributed computing resource 102 running replication framework 120 or analytics framework 204.

At block 902, an update record may be received, e.g., by distributed computing resource 102. In some examples, block 902 may represent block 604 or block 802. In some of these examples, block 904 (discussed below) may be performed following block 604 or block 802. In some examples, block 904 may be performed in response to receipt of an update record corresponding to stored context data 118, e.g., to at least one context dataset 404.

At block 904, distributed computing resource 102 determines a match between the received update record and stored trigger conditions. The trigger conditions may be, e.g., as discussed above with reference to observer unit(s) 202. If there is no match, the next block may be block 902, e.g., to await another update record. If there is a match, the next block is block 906.

At block 906, in response to the match, distributed computing resource 102 selects data from the stored context data 118 based at least in part on stored input criteria. The stored input criteria may set forth, e.g., what data an observer unit 202 is configured to process, as discussed above with reference to FIG. 2. The selection may include executing a query, filtering, producing a report, or otherwise transforming, subsetting, or extracting data from context data 118.

At block 908, distributed computing resource 102 transmits the selected data to an observer unit 202. Example functions performed in block 908 are described above with reference to observer unit 202, FIG. 2. The transmission may be performed via, e.g., communications interface 116 or an interprocess communication (IPC) or remote procedure call (RPC) subsystem executing on processing unit(s) 110. Block 908 may be followed by block 910, e.g., for execution of observer unit(s) 202 under security restrictions, or block 912, e.g., for remote or non-restricted execution of observer unit(s) 202.

At block 910, distributed computing resource 102 carries out computer program instructions of observer unit 202 in a restricted-privilege execution configuration, commonly referred to as a "sandbox." As discussed above, observer unit(s) 202 may be implemented using software plugins. Distributed computing resource 102 may execute computer program instructions of a plugin host that permits software plugin(s) to operate. The plugin host may establish a sandbox that prevents software plugins from, e.g., writing files on computer-readable media 112 or establishing connections via network 106 with computing systems not on a "whitelist" of trusted systems. The plugin host may also, before permitting any software plugin to execute, use cryptographic-signature-verification techniques to determine that the plugin carries a cryptographic signature from a trusted party. The plugin host may prevent unsigned software plugins from executing.

At block 912, distributed computing resource 102 receives a second update record from observer unit 202. Example functions performed in block 912 are described above with reference to observer unit 202, FIG. 2. The receiving may be performed via, e.g., communications interface 116 or the interprocess communication (IPC) or remote procedure call (RPC) subsystem.

At block 914, distributed computing resource 102 modifies the stored context data 118 based at least in part on the received second update record. Example functions performed in block 914 are described above with reference to replication framework 120, FIGS. 1 and 2.

Figure 10:
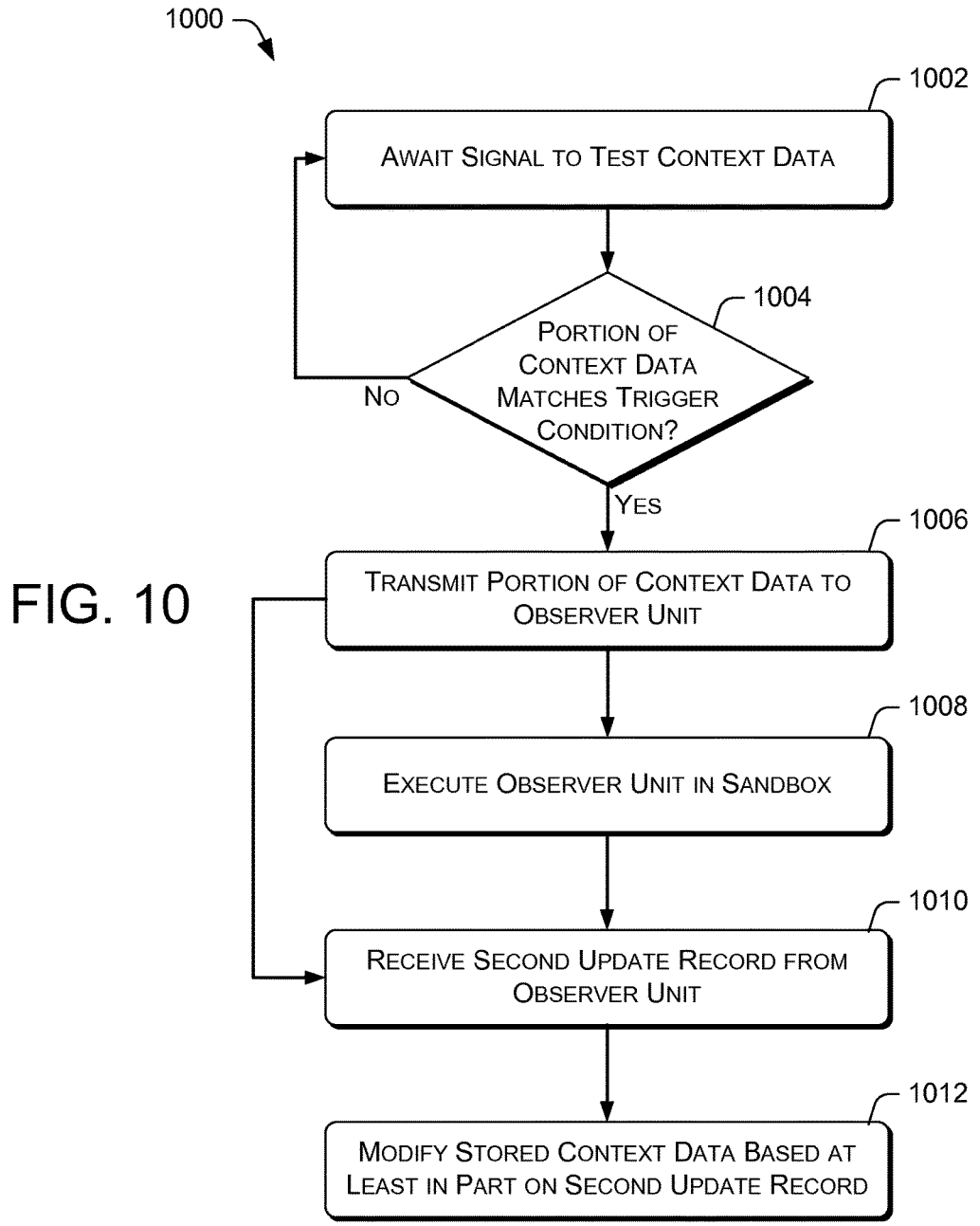
FIG. 10 is a flow diagram that illustrates an example process for managing context data in a distributed system according to some examples described herein.

FIG. 10 is a flow diagram that illustrates an example process 1000 for managing context data 118 in a distributed system, e.g., using distributed computing resource 102 running replication framework 120 or analytics framework 204.

At block 1002, distributed computing resource 102 may await a signal to test context data 118. In some examples, the signal may be produced by replication framework 120 or committing module 418 thereof in response to a change in the context data. In some examples, the signal may be produced by a module of distributed computing resource 102 or one or more computing device(s) 104. In some examples, block 1002 may be responsive to signals produced in block 604, block 606, block 802, block 810, or block 914. In some of these examples, block 1004 (discussed below) may be performed following block 604, block 606, block 802, block 810, or block 914, or following block 1012 or block 1106, both discussed below. In some examples, block 1004 may be performed in response to receipt of an update record corresponding to stored context data 118, e.g., to at least one context dataset 404. In some examples, block 1004 may be performed in response to modification of stored context data 118, e.g., to at least one context dataset 404.

At block 1004, distributed computing resource 102 may determine a match between at least part of the stored context data 118 and stored trigger conditions. The at least part of the stored context data 118 may be include recently-modified data (e.g., when block 1004 follows block 914) or data that is not recently modified. The trigger conditions may be, e.g., as discussed above with reference to observer unit(s) 202. If there is no match, the next block may be block 1002, e.g., to await another signal to test context data 118. If there is a match, the next block is block 1006. In an example, distributed computing resource 102 may determine the match using, e.g., a MICROSOFT Rx standing query or a SQL stored procedure that succeeds when the portion of the context data matches the trigger condition. In some examples, the trigger condition may include multiple separate criteria, so that the trigger condition is matched when any of the criteria are satisfied.

At block 1006, in response to the match, distributed computing resource 102 may transmit the at least part of the stored context data to an observer unit 202. For example, the trigger conditions may be a database query returning entire rows from selected tables based on specified criteria. The at least part of the stored context may be the returned rows. Transmission may be performed as described above with reference to block 908. Block 1006 may be followed by block 1008 or block 1010.

At block 1008, distributed computing resource 102 carries out computer program instructions of observer unit 202 in a restricted-privilege execution configuration ("sandbox"). Example functions performed in block 1008 are described above with reference to block 910.

At block 1010, distributed computing resource 102 receives a second update record from observer unit 202. Example functions performed in block 1010 are described above with reference to block 912.

At block 1012, distributed computing resource 102 modifies the stored context data based at least in part on the received second update record. Example functions performed in block 1012 are described above with reference to block 914.

In some examples, using the replication server, a second plurality of propagation records may be determined based at least in part on the received second update record, wherein each of the propagation records corresponds to a respective, different proper subset of the stored context data. The propagation records of the second plurality of propagation records may be transmitted to respective ones of the replication clients via one or more communications interfaces. This may permit reactive event triggering, in which one event may trigger other events.

Figure 11:
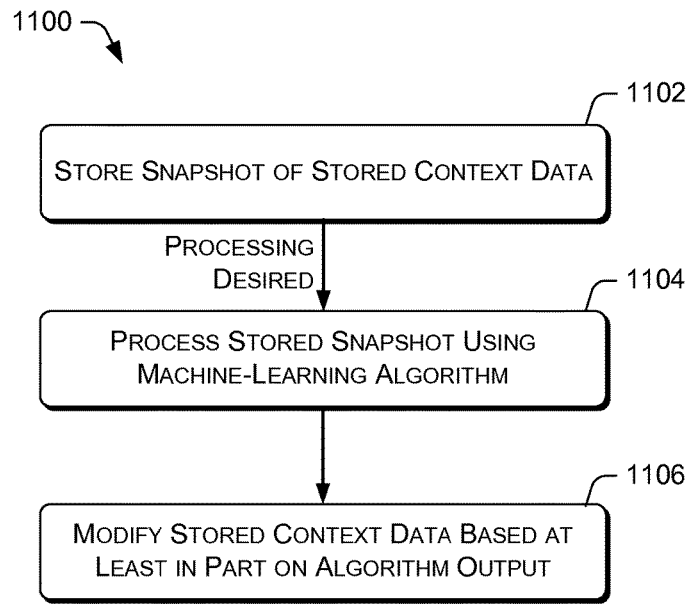
FIG. 11 is a flow diagram that illustrates an example process for processing context data in a distributed system according to some examples described herein.

FIG. 11 is a flow diagram that illustrates an example process 1100 for processing context data 118 in a distributed system, e.g., using distributed computing resource 102 running replication framework 120 or analytics framework 204. In some examples, block 604 or block 802 may be followed by block 1102. Block 1102 may be performed in response to receipt of an update record corresponding to stored context data 118, e.g., to at least one context dataset 404. Block 1102 may additionally or alternatively be performed on a schedule, regularly, intermittently, or when the size or contents of context data 118 have changed more than a selected threshold (e.g., in bytes or number of updated records, respectively).

At block 1102, distributed computing resource 102 stores a snapshot of the stored context data 118. Block 1102 may include, e.g., copying some or all of stored context data 118, or of one or more context dataset(s) 404, to distributed computing resource 102(2), e.g., a database server, or another repository. Block 1102 may include exporting some or all of stored context data 118, or of one or more context dataset(s) 404, to a removable medium, e.g., a CD-ROM, BLU-RAY data disc, tape, or removable Flash-memory storage. The method may terminate after block 1102, or, if processing is desired, block 1102 may be followed by block 1104.

At block 1104, distributed computing resource 102 (e.g., 102(1) or 102(M), FIG. 2) processes the stored snapshot using a machine-learning algorithm. In some examples, the machine-learning algorithm may include a neural-network training algorithm. Example functions performed in block 1104 are described above with reference to analytics framework 204 and modifying module 420.

At block 1106, distributed computing resource 102 modifies the stored context data based at least in part on an output of the machine-learning algorithm. Example functions performed in block 1106 are described above with reference to committing module 418.

Figure 12:
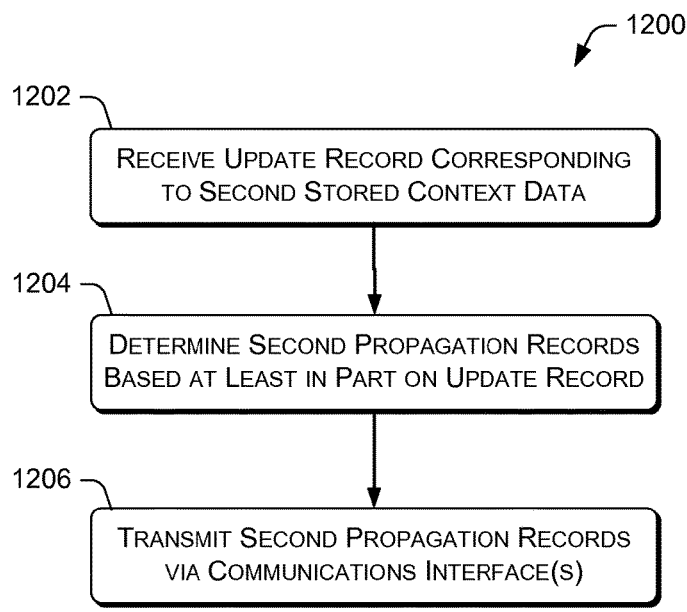
FIG. 12 is a flow diagram that illustrates an example process for managing propagation of context data in a distributed system according to some examples described herein.

FIG. 12 is a flow diagram that illustrates an example process 1200 for managing propagation of context data 118 in a distributed system, e.g., using distributed computing resource 102 running replication framework 120. In some examples, block 604, block 610, or block 802 may be followed by block 1202. Block 1202 may be performed in response to receipt of an update record corresponding to stored context data 118, e.g., to at least one context dataset 404.

At block 1202, distributed computing resource 102 receives a second update record corresponding to second stored context data. In at least some examples, block 604, FIG. 6, includes receiving the update record corresponding to a first context dataset, e.g., context dataset 404(1). In these examples, block 1202 includes receiving the second update record corresponding to a second context dataset, e.g., context dataset 404(K). Example functions performed in block 1106 are described above with reference to receiving module 412.

At block 1204, distributed computing resource 102 determines a plurality of second propagation records based at least in part on the received update record. Each of the second propagation records corresponds to a respective, different proper subset of the second stored context data, e.g., context dataset 404(K). Example functions performed in block 1106 are described above with reference to determining-propagation module 414.

At block 1206, distributed computing resource 102 transmits the plurality of second propagation records via one or more communications interfaces, wherein at least one of the second propagation records is transmitted with second identifying information. Example functions performed in block 1106 are described above with reference to transmitting module 416. In some examples, the second identifying information matches the respective identifying information of at least one of the plurality of propagation records. This permits two different context modifications for different context datasets to be provided with the same destination, e.g., a single computing device 104.

Figure 13:
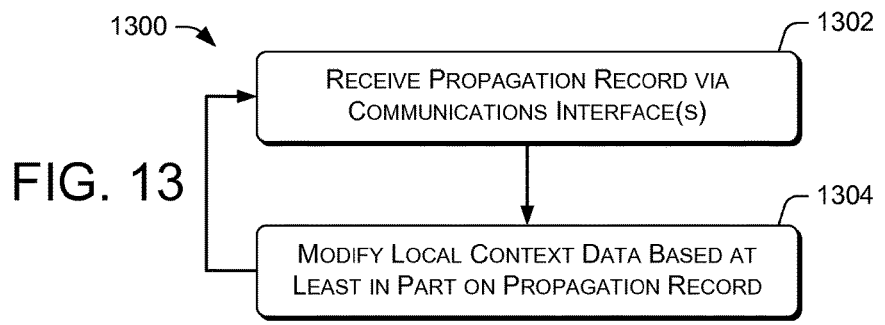
FIG. 13 is a flow diagram that illustrates an example process for modifying local context data in a distributed system according to some examples described herein.

FIG. 13 is a flow diagram that illustrates an example process 1300 for modifying local context data 130, e.g., using computing device 104 running interaction framework 134.

At block 1302, interaction framework 134 receives a propagation record via the communications interface 130, e.g., from a replication controller or other distributed computing resource 102. Example functions performed in block 1302 are described above with reference to propagation-receiving module 516, FIG. 5.

At block 1304, interaction framework 134 modifies local context data 132 based at least in part on the received propagation record. Example functions performed in block 1304 are described above with reference to propagation-applying module 518, FIG. 5. In some examples, block 1304 may be followed by block 1402, FIG. 14.

In some examples, block 1304 may be followed by block 1302. In this way, blocks 1302, 1304 may be repeated for additional propagation records. In some examples, at block 1302, a second propagation record is received via the communications interface. At block 1304, second local context data (e.g., local context subset 514(L)) different from the local context data (e.g., local context subset 514(1)) is modified based at least in part on the received second propagation record.

Figure 14:
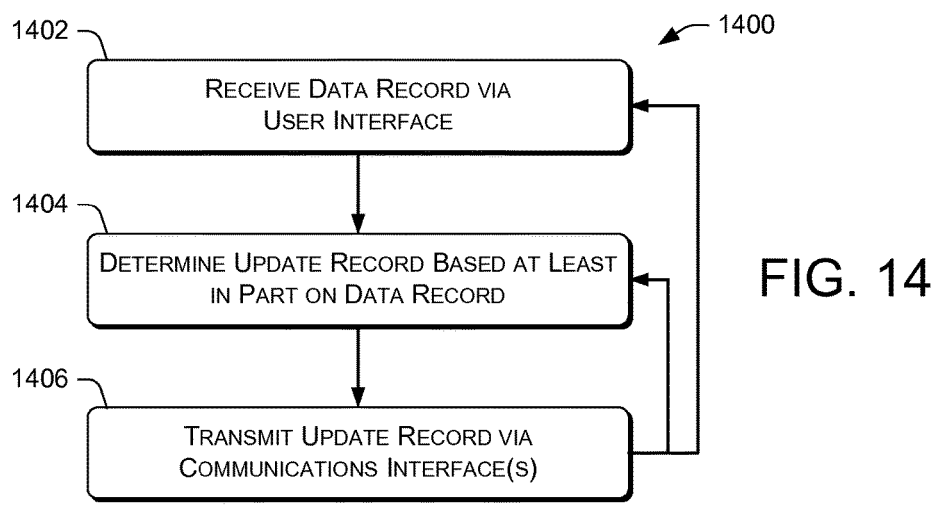
FIG. 14 is a flow diagram that illustrates an example process for modifying context data based on changes to local context data in a distributed system according to some examples described herein.

FIG. 14 is a flow diagram that illustrates an example process 1400 for modifying context data 118 based on changes to local context data 130, e.g., using computing device 104 running interaction framework 134.

At block 1402, interaction framework 134 receives a data record, e.g., via user interface 136. Example functions performed in block 1402 are described above with reference to inputting module 520, FIG. 5. The received data record may be referred to as a first data record.

At block 1404, interaction framework 134 determines an update record based at least in part on the received data record and local context data 132. Example functions performed in block 1404 are described above with reference to replication module 522, FIG. 5.

At block 1406, interaction framework 134 transmits the determined update record via communications interface 130. Example functions performed in block 1406 are described above with reference to transmitting module 524, FIG. 5. Block 1406 may be followed by block 1404. In this way, one or more update records may be determined and transmitted for a given data record. In some examples, block 1406 may be followed by block 1502, FIG. 15.

In some examples, block 1406 may be followed by block 1402. In this way, blocks 1402, 1404, and 1406 may be repeated for multiple data records. Block 1402 may include receiving a second data record, e.g., via user interface 136. Block 1404 may include determining a second update record based at least in part on the second data record and second local context data (e.g., local context subset 514(L)) different from the local context data (e.g., local context subset 514(1)). Block 1406 may include transmitting the determined second update record via communications interface 130.

Figure 15:
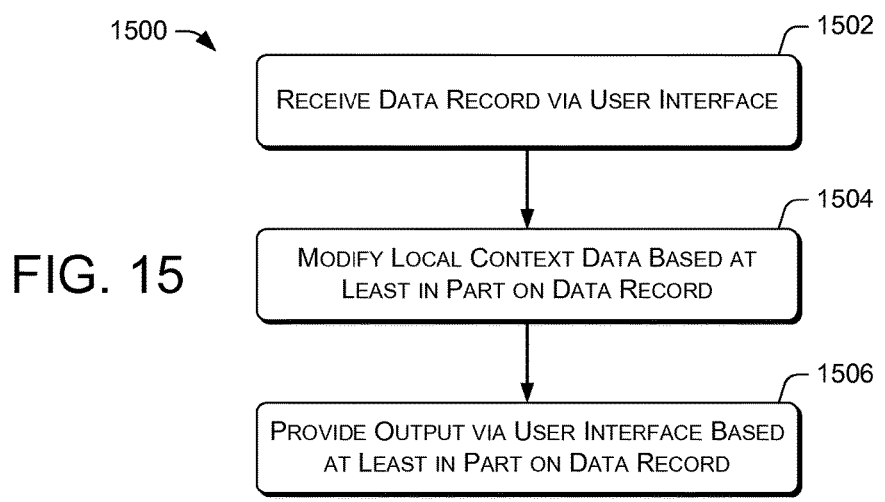
FIG. 15 is a flow diagram that illustrates an example process for changing form or content of a user interface based on changes to local context data according to some examples described herein.

FIG. 15 is a flow diagram that illustrates an example process 1500 for changing user interface 136, e.g., in form or content, based at least in part on changes to local context data 130, e.g., using computing device 104 running interaction framework 134.

At block 1502, interaction framework 134 receives a data record via user interface 136. This data record may be referred to as an additional data record. Example functions performed in block 1502, and example sensors 512 from which data record(s) may be received, are described above with reference to inputting module 520 and interaction module 526, FIG. 5.

At block 1504, interaction framework 134 modifies local context data 132 based at least in part on the data record. Example functions performed in block 1504 are described above with reference to interaction module 526, FIG. 5.

At block 1506, interaction framework 134 provides an output via user interface 136. The output, e.g., a visible display or audible alarm, is based at least in part on the data record and the modified local context data 132. Example functions performed in block 1506 are described above with reference to interaction module 526, FIG. 5. The output may be provided, e.g., before or concurrently with transmission of an update record (block 1406), which may reduce latency in updating user interface 136 based on the data record.

In some examples, operations shown in FIGS. 9, 14, and 15 may be performed in any order, any number of times. For example, multiple first data records may be received and processed (FIG. 14) in between processing of two additional data records (FIG. 15).

Some examples described above relate to distributing context data 118 between computing device(s) 104 using distributed computing resource(s) 102. A technical effect of some examples is to reduce bandwidth and processing cycles required, on computing device(s) 104 or distributed computing resource(s) 102, to process modifications of context data 118 and local context data 132. Another technical effect of some examples is to process data of the world determined using sensor(s) 512, and to modify context data 118 based on the processed data. Another technical effect of some examples is to present, on an electronic display, a visual representation of internal state of a computing device 104, e.g., information in local context data 132 such as information derived from measurements using sensor(s) 512.

Example Clauses

A: A method of replicating data using a replication server of a multi-user system, the method comprising: storing context data on the replication server, the context data related to interaction(s) of one or more user(s) with or via the multi-user system; receiving, from a first one of a plurality of replication clients of the multi-user system, an update record corresponding to less than all of the stored context data; modifying the stored context data based at least in part on the received update record; using the replication server, automatically determining a plurality of propagation records based at least in part on the received update record, wherein each of the propagation records corresponds to a respective, different proper subset of the stored context data; and transmitting the propagation records of the plurality of propagation records to respective ones of the replication clients via one or more communications interfaces.

B: The method as paragraph A recites, wherein: the update record corresponds to a request from a user for technical support; the stored context data includes first information regarding a configuration of a computing device of the user and second information identifying a support technician; the plurality of propagation records includes: a first propagation record including the first information and omitting the second information; and a second propagation record including the second information and omitting the first information; and the transmitting further includes transmitting the first propagation record to a replication client of the support technician and transmitting the second propagation record to a replication client of the user.

C: The method as paragraph A or B recites, further comprising: receiving, from a second, different one of the plurality of replication clients, a second update record corresponding to less than all of the stored context data; using the replication server, automatically determining a plurality of second propagation records based at least in part on the received second update record, wherein each of the second propagation records corresponds to a respective, different proper subset of the stored context data; and transmitting the plurality of second propagation records via one or more communications interfaces, wherein at least one of the propagation records and at least one of the second propagation records are transmitted to a selected one of the plurality of replication clients.

D: The method as any of paragraphs A-D recites, further comprising: determining a match between the update record and stored trigger conditions; and in response to the match: selecting data from the stored context data based at least in part on stored input criteria; transmitting the selected data to an observer unit; receiving a second update record from the observer unit; and modifying the stored context data based at least in part on the received second update record.

E: The method as paragraph D recites, further comprising: using the replication server, automatically determining a second plurality of propagation records based at least in part on the received second update record, wherein each of the propagation records corresponds to a respective, different proper subset of the stored context data; transmitting the propagation records of the second plurality of propagation records to respective ones of the replication clients via the one or more communications interfaces.

F: The method as paragraph D or E recites, further comprising carrying out computer program instructions of the observer unit in a restricted-privilege execution configuration.

G: The method as any of paragraphs A-F recites, further comprising: determining a match between at least part of the stored context data and stored trigger conditions; and in response to the match: transmitting the at least part of the stored context data to an observer unit; receiving a second update record from the observer unit; and modifying the stored context data based at least in part on the received second update record.

H: The method as any of paragraphs A-G recites, wherein: the receiving includes accepting data of the update record in response to a signal from the first one of the plurality of replication clients; and the transmitting includes transmitting respective notification signals to respective ones of the replication clients.

I: The method as any of paragraphs A-H recites, further comprising: storing a snapshot of the stored context data separate from the stored context data; processing the stored snapshot using a machine-learning algorithm; and modifying the stored context data based at least in part on an output of the machine-learning algorithm.

J: The method as paragraph I recites, the machine-learning algorithm including a neural-network training algorithm.

K: A server of a multi-user system, the server comprising: a communications interface; one or more processing units operably coupled to the communications interface; and one or more computer storage media having stored thereon: context data of a multi-user system, the context data related to interaction(s) of one or more user(s) with or via the multi-user system and including respective data from each of a plurality of data sources; a plurality of subset indications, each subset identification identifying a respective proper subset of the context data and corresponding to a respective replication client of the multi-user system; and instructions that, when executed by the one or more processing units, cause the one or more processing units to perform operations comprising: receiving a query specification referencing one or more of the plurality of data sources; selecting one of the subset indications based at least in part on the received query specification; and transmitting the received query specification via the communications interface to a replication client of the multi-user system corresponding to the selected one of the subset indications.

L: The server as paragraph K recites, the operations further comprising: receiving an update record via the communications interface; determining one or more propagation records at least in part by applying a rule set to the update record and the context data to identify patterns in the context data indicative of actionable events, wherein each of the propagation records corresponds to a respective, different proper subset of the stored context data; and modifying the rule set based at least in part on the context data.

M: The server as paragraph L recites, the operations further comprising modifying the context data based at least in part on the received update record.

N: The server as paragraph L or M recites, the modifying operations including applying at least some of the context data to a neural network and modifying the rule set based at least in part on an output of the neural network.

O: A replication client of a multi-user system, the replication client comprising: a communications interface; a user interface; one or more processing units operably coupled to the communications interface and the user interface; and one or more computer storage media having thereon local context data and instructions that, when executed by the one or more processing units, cause the one or more processing units to perform operations comprising: receiving a propagation record from a replication server via the communications interface; modifying the local context data based at least in part on the received propagation record, wherein the local context data is related to interaction(s) of one or more user(s) with the multiuser system; receiving a data record via the user interface; determining an update record based at least in part on the data record and the local context data; and transmitting the determined update record to the replication server via the communications interface to update context data stored at the replication server.

P: The replication client as paragraph O recites, the operations further comprising: receiving an additional data record via the user interface; modifying the local context data based at least in part on the additional data record; and providing an output via the user interface based at least in part on the modified local context data.

Q: The replication client as paragraph P recites, the providing the output being performed prior to communicating via the communications interface.

R: The replication client as any of paragraphs O-Q recites, the operations further comprising: receiving a second propagation record via the communications interface; and modifying second local context data different from the local context data based at least in part on the received second propagation record.

S: The replication client as any of paragraphs O-R recites, the operations further comprising: receiving a second data record; determining a second update record based at least in part on the second data record and second local context data different from the local context data; and transmitting the determined second update record via the communications interface.

T: The replication client as any of paragraphs O-S recites, the replication client further comprising a sensor and the operations further comprising: receiving, via the communications interface, a query specification including a database query referencing the sensor; retrieving data from the sensor; performing the database query using the retrieved data; and transmitting a result of the performed database query via the communications interface.

U: A system comprising: one or more communications interface(s); one or more processing units coupled to the communications interface(s); and one or more computer-readable media, e.g., computer storage media, coupled to the processing units and storing instructions that, when executed by the one or more processing units, cause one or more processing units to perform operations as any of paragraphs A-J recites.

V: A computer-readable medium having thereon computer-executable instructions, the computer-executable instructions upon execution configuring a computer to perform operations as any of paragraphs A-J recites.

W: A system, comprising: means for storing context data on a replication server of a multi-user system, the context data related to interaction(s) of one or more user(s) with or via the multi-user system; means for receiving, from a first one of a plurality of replication clients of the multi-user system, an update record corresponding to less than all of the stored context data; means for modifying the stored context data based at least in part on the received update record; means for, using the replication server, automatically determining a plurality of propagation records based at least in part on the received update record, wherein each of the propagation records corresponds to a respective, different proper subset of the stored context data; and means for transmitting the propagation records of the plurality of propagation records to respective ones of the replication clients via one or more communications interfaces.

X: The system as paragraph W recites, wherein: the update record corresponds to a request from a user for technical support; the stored context data includes first information regarding a configuration of a computing device of the user and second information identifying a support technician; the plurality of propagation records includes: a first propagation record including the first information and omitting the second information; and a second propagation record including the second information and omitting the first information; and the means for transmitting further includes means for transmitting the first propagation record to a replication client of the support technician and transmitting the second propagation record to a replication client of the user.

Y: The system as paragraph W or X recites, further comprising: means for receiving, from a second, different one of the plurality of replication clients, a second update record corresponding to less than all of the stored context data; means for, using the replication server, automatically determining a plurality of second propagation records based at least in part on the received second update record, wherein each of the second propagation records corresponds to a respective, different proper subset of the stored context data; and means for transmitting the plurality of second propagation records via one or more communications interfaces, wherein at least one of the propagation records and at least one of the second propagation records are transmitted to a selected one of the plurality of replication clients.

Z: The system as any of paragraphs W-Z recites, further comprising: means for determining a match between the update record and stored trigger conditions; and means for, in response to the match: selecting data from the stored context data based at least in part on stored input criteria; transmitting the selected data to an observer unit; receiving a second update record from the observer unit; and modifying the stored context data based at least in part on the received second update record.

AA: The system as paragraph Z recites, further comprising: means for, using the replication server, automatically determining a second plurality of propagation records based at least in part on the received second update record, wherein each of the propagation records corresponds to a respective, different proper subset of the stored context data; and means for transmitting the propagation records of the second plurality of propagation records to respective ones of the replication clients via the one or more communications interfaces.

AB: The system as paragraph Z or AA recites, further comprising means for carrying out computer program instructions of the observer unit in a restricted-privilege execution configuration.

AC: The system as any of paragraphs W-AB recites, further comprising: means for determining a match between at least part of the stored context data and stored trigger conditions; and means for, in response to the match: transmitting the at least part of the stored context data to an observer unit; receiving a second update record from the observer unit; and modifying the stored context data based at least in part on the received second update record.

AD: The system as any of paragraphs W-AC recites, wherein: the means for receiving includes means for accepting data of the update record in response to a signal from the first one of the plurality of replication clients; and the means for transmitting includes means for transmitting respective notification signals to respective ones of the replication clients.

AE: The system as any of paragraphs W-AD recites, further comprising: means for storing a snapshot of the stored context data separate from the stored context data; means for processing the stored snapshot using a machine-learning algorithm; and means for modifying the stored context data based at least in part on an output of the machine-learning algorithm.

AF: The system as paragraph AE recites, the machine-learning algorithm including a neural-network training algorithm.

AG: The method as any of paragraphs A-J recites, further comprising carrying out computer program instructions of the observer unit in a restricted-privilege execution configuration.

AH: The method as any of paragraphs A-J recites, the transmitting further including transmitting respective identifying information with each of the plurality of propagation records and the method further comprising: receiving a second update record corresponding to second stored context data; determining a plurality of second propagation records based at least in part on the received update record, wherein each of the second propagation records corresponds to a respective, different proper subset of the second stored context data; and transmitting the plurality of second propagation records via one or more communications interfaces, wherein at least one of the second propagation records is transmitted with second identifying information and the second identifying information matches the respective identifying information of at least one of the plurality of propagation records.

AI: A system comprising: one or more communications interface(s); one or more processing units coupled to the communications interface(s); and one or more computer-readable media, e.g., computer storage media, coupled to the processing units and storing instructions that, when executed by the one or more processing units, cause one or more processing units to perform operations as paragraph AG or AH recites.

AJ: A computer-readable medium having thereon computer-executable instructions, the computer-executable instructions upon execution configuring a computer to perform operations as paragraph AG or AH recites.

AK: The system as any of paragraphs W-AF recites, further comprising means for carrying out computer program instructions of the observer unit in a restricted-privilege execution configuration.

AL: The system as any of paragraphs W-AF or AK recites, the means for transmitting further including means for transmitting respective identifying information with each of the plurality of propagation records and the system further comprising: means for receiving a second update record corresponding to second stored context data; means for determining a plurality of second propagation records based at least in part on the received update record, wherein each of the second propagation records corresponds to a respective, different proper subset of the second stored context data; and means for transmitting the plurality of second propagation records via one or more communications interfaces, wherein at least one of the second propagation records is transmitted with second identifying information and the second identifying information matches the respective identifying information of at least one of the plurality of propagation records.

Conclusion

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which may represent one or more operations that may be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be executed in any order, combined in any order, subdivided into multiple sub-operations, and/or executed in parallel to implement the described processes. The described processes may be performed by resources associated with one or more device(s) 102, 104 such as one or more internal or external CPUs or GPUs, and/or one or more pieces of hardware logic such as FPGAs, DSPs, or other types described above.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "may," "could," "might" or "may," unless specifically stated otherwise, are understood within the context to present that certain examples include, while other examples do not include, certain features, elements and/or operations. Thus, such conditional language is not generally intended to imply that certain features, elements and/or operations are in any way required for one or more examples or that one or more examples necessarily include logic for deciding, with or without user input or prompting, whether certain features, elements and/or operations are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternative implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method of replicating data using a replication server of a multi-user system, the method comprising:
   storing context data on the replication server, the context data related to interaction(s) of one or more user(s) with or via the multi-user system;
   receiving, from a first one of a plurality of replication clients of the multi-user system, an update record corresponding to less than all of the stored context data;
   modifying the stored context data based at least in part on the received update record;
   using the replication server, automatically determining a plurality of propagation records based at least in part on the received update record, wherein: each of the plurality of propagation records corresponds to a respective, different proper subset of the stored context data;
   transmitting each of the propagation records of the plurality of propagation records to respective ones of the replication clients via one or more communications interfaces;
   determining a match between stored trigger conditions and at least one of:
      the update record, or
      at least part of the stored context data; and
   in response to the match:
      selecting data from the stored context data based at least in part on stored input criteria;
      providing the selected data to an observer unit;
      determining whether the observer unit operates under security restrictions;
      carrying out computer program instructions of the observer unit in a restricted-privilege execution configuration to prevent unsigned plugins from executing based on a determination that the observer unit operates under security restrictions;
      receiving a second update record from the observer unit based on a determination that the observer unit does not operate under security restrictions; and
      modifying the stored context data based at least in part on the received second update record.

2. The method as claim 1 recites, wherein:
   the update record corresponds to a first replication client and a computing device;
   the stored context data includes first information regarding a configuration of the computing device and second information different from the first information, wherein the second information is associated with a second replication client;
   the plurality of propagation records includes:
      a first propagation record including the first information and omitting the second information; and
      a second propagation record including the second information and omitting the first information; and
   the transmitting further includes transmitting the first propagation record to the second replication client and transmitting the second propagation record to the first replication client.

3. The method as claim 1 recites, further comprising:
   receiving, from a second, different one of the plurality of replication clients, a second update record corresponding to less than all of the stored context data;
   using the replication server, automatically determining a plurality of second propagation records based at least in part on the received second update record, wherein each of the second propagation records corresponds to a respective, different proper subset of the stored context data; and
   transmitting the plurality of second propagation records via one or more communications interfaces, wherein at least one of the propagation records and at least one of the second propagation records are transmitted to a selected one of the plurality of replication clients.

4. The method as claim 1 recites, further comprising:
   using the replication server, automatically determining a second plurality of propagation records based at least in part on the received second update record, wherein each of the propagation records corresponds to a respective, different proper subset of the stored context data; and
   transmitting the propagation records of the second plurality of propagation records to respective ones of the replication clients via the one or more communications interfaces.

5. The method as claim 1 recites, wherein:
   the receiving includes accepting data of the update record in response to a signal from the first one of the plurality of replication clients; and
   the transmitting includes transmitting respective notification signals to respective ones of the replication clients.

6. The method as claim 1 recites, further comprising:
   storing a snapshot of the stored context data separate from the stored context data;
   processing the stored snapshot using a machine-learning algorithm; and
   modifying the stored context data based at least in part on an output of the machine-learning algorithm.

7. The method as claim 6 recites, the machine-learning algorithm including a neural-network training algorithm.

8. A replication server for replicating data in a multi-user system, comprising:
   a communication interface;
   one or more processing units operably coupled to the communications interface; and
   one or more computer storage media having stored thereon instructions that, when executed by the one or more processing units, cause the one or more processing units to perform operations comprising:
      storing context data on the replication server, the context data related to interaction(s) of one or more user(s) with or via the multi-user system;
      receiving, from a first one of a plurality of replication clients of the multi-user system, an update record corresponding to less than all of the stored context data;
      modifying the stored context data based at least in part on the received update record;
      using the replication server, automatically determining a plurality of propagation records based at least in part on the received update record, wherein: each of the plurality of propagation records corresponds to a respective, different proper subset of the stored context data;

transmitting each of the propagation records of the plurality of propagation records to respective ones of the replication clients via the communications interface;
determining a match between stored trigger conditions and at least one of:
the update record, or
at least part of the stored context data; and
in response to the match:
selecting data from the stored context data based at least in part on stored input criteria;
providing the selected data to an observer unit;
determining whether the observer unit operates under security restrictions;
carrying out computer program instructions of the observer unit in a restricted-privilege execution configuration to prevent unsigned plugins from executing based on a determination that the observer unit operates under security restrictions;
receiving a second update record from the observer unit based on a determination that the observer unit does not operate under security restrictions; and
modifying the stored context data based at least in part on the received second update record.

9. The replication server of claim 8 recites, wherein:
the update record corresponds to a first replication client and a computing device;
the stored context data includes first information regarding a configuration of the computing device and second information different from the first information, wherein the second information is associated with a second replication client;
the plurality of propagation records includes:
a first propagation record including the first information and omitting the second information; and
a second propagation record including the second information and omitting the first information; and
the transmitting further includes transmitting the first propagation record to the second replication client and transmitting the second propagation record to the first replication client.

10. The replication server of claim 8 recites, wherein the one or more processing units are further configured to perform:
receiving, from a second, different one of the plurality of replication clients, a second update record corresponding to less than all of the stored context data;
using the replication server, automatically determining a plurality of second propagation records based at least in part on the received second update record, wherein each of the second propagation records corresponds to a respective, different proper subset of the stored context data; and
transmitting the plurality of second propagation records via one or more communications interfaces, wherein at least one of the propagation records and at least one of the second propagation records are transmitted to a selected one of the plurality of replication clients.

11. The replication server of claim 8 recites, wherein the one or more processing units are further configured to perform:
using the replication server, automatically determining a second plurality of propagation records based at least in part on the received second update record, wherein each of the propagation records corresponds to a respective, different proper subset of the stored context data; and
transmitting the propagation records of the second plurality of propagation records to respective ones of the replication clients via the one or more communications interfaces.

12. The replication server of claim 8 recites, wherein:
the receiving includes accepting data of the update record in response to a signal from the first one of the plurality of replication clients; and
the transmitting includes transmitting respective notification signals to respective ones of the replication clients.

13. The replication server of claim 8 recites, wherein the one or more processing units are further configured to perform:
storing a snapshot of the stored context data separate from the stored context data;
processing the stored snapshot using a machine-learning algorithm; and
modifying the stored context data based at least in part on an output of the machine-learning algorithm.

14. The replication server of claim 13 recites, wherein the machine-learning algorithm including a neural-network training algorithm.

15. A non-transitory computer-readable medium storing computer executable code for wireless communications, comprising code for:
storing context data on a replication server, the context data related to interaction(s) of one or more user(s) with or via a multi-user system;
receiving, from a first one of a plurality of replication clients of the multi-user system, an update record corresponding to less than all of the stored context data;
modifying the stored context data based at least in part on the received update record;
using the replication server, automatically determining a plurality of propagation records based at least in part on the received update record, wherein: each of the plurality of propagation records corresponds to a respective, different proper subset of the stored context data;
transmitting each of the propagation records of the plurality of propagation records to respective ones of the replication clients via one or more communications interfaces;
determining a match between stored trigger conditions and at least one of:
the update record, or
at least part of the stored context data; and
in response to the match:
selecting data from the stored context data based at least in part on stored input criteria;
providing the selected data to an observer unit;
determining whether the observer unit operates under security restrictions;
carrying out computer program instructions of the observer unit in a restricted-privilege execution configuration to prevent unsigned plugins from executing based on a determination that the observer unit operates under security restrictions;
receiving a second update record from the observer unit based on a determination that the observer unit does not operate under security restrictions; and
modifying the stored context data based at least in part on the received second update record.

16. The non-transitory computer-readable medium of claim 15 recites, wherein:

the update record corresponds to a first replication client and a computing device;

the stored context data includes first information regarding a configuration of the computing device and second information different from the first information, wherein the second information is associated with a second replication client;

the plurality of propagation records includes:
  a first propagation record including the first information and omitting the second information; and
  a second propagation record including the second information and omitting the first information; and the transmitting further includes transmitting the first propagation record to the second replication client and transmitting the second propagation record to the first replication client.

17. The non-transitory computer-readable medium of claim 15 recites, further comprising code for:
  receiving, from a second, different one of the plurality of replication clients, a second update record corresponding to less than all of the stored context data;
  using the replication server, automatically determining a plurality of second propagation records based at least in part on the received second update record, wherein each of the second propagation records corresponds to a respective, different proper subset of the stored context data; and
  transmitting the plurality of second propagation records via one or more communications interfaces, wherein at least one of the propagation records and at least one of the second propagation records are transmitted to a selected one of the plurality of replication clients.

18. The non-transitory computer-readable medium of claim 15 recites, further comprising code for:
  using the replication server, automatically determining a second plurality of propagation records based at least in part on the received second update record, wherein each of the propagation records corresponds to a respective, different proper subset of the stored context data; and
  transmitting the propagation records of the second plurality of propagation records to respective ones of the replication clients via the one or more communications interfaces.

19. The non-transitory computer-readable medium of claim 15 recites, wherein:
  the receiving includes accepting data of the update record in response to a signal from the first one of the plurality of replication clients; and
  the transmitting includes transmitting respective notification signals to respective ones of the replication clients.

20. The non-transitory computer-readable medium of claim 15 recites, further comprising code for:
  storing a snapshot of the stored context data separate from the stored context data;
  processing the stored snapshot using a machine-learning algorithm; and
  modifying the stored context data based at least in part on an output of the machine-learning algorithm.

* * * * *